(12) United States Patent
Nishimura et al.

(10) Patent No.: US 11,344,106 B2
(45) Date of Patent: May 31, 2022

(54) LIFTING HOOK FOR LOCKING TO CARABINER

(71) Applicant: YAMABIKO CORPORATION, Tokyo (JP)

(72) Inventors: Atsushi Nishimura, Tokyo (JP); Takeshi Maeno, Tokyo (JP); Noriyuki Takeuchi, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 17/010,856

(22) Filed: Sep. 3, 2020

(65) Prior Publication Data
US 2021/0093077 A1    Apr. 1, 2021

(30) Foreign Application Priority Data

Sep. 27, 2019    (JP) .............................. JP2019-178112

(51) Int. Cl.
| | | |
|---|---|---|
| A45F 5/02 | (2006.01) | |
| A45F 5/00 | (2006.01) | |
| B27B 17/00 | (2006.01) | |

(52) U.S. Cl.
CPC ........ *A45F 5/021* (2013.01); *A45F 2005/006* (2013.01); *A45F 2200/0575* (2013.01); *B27B 17/0008* (2013.01); *B27B 17/0083* (2013.01)

(58) Field of Classification Search
CPC ......... A45F 2200/0575; Y10T 24/4523; Y10T 24/45236; B25H 5/00; B25H 5/02; B25H 3/00; B27B 17/0008; B27B 17/0083; B25F 5/02

USPC ......................................................... 224/269
See application file for complete search history.

(56) References Cited

U.S. PATENT DOCUMENTS

| | | | | |
|---|---|---|---|---|
| 4,209,157 | A * | 6/1980 | Edmisten ................ | F41C 33/00 248/691 |
| 6,179,192 | B1 * | 1/2001 | Weinger .................. | B25C 1/005 227/8 |
| 8,443,913 | B2 * | 5/2013 | Nagasaka ................ | B25F 5/02 173/171 |
| 8,534,375 | B2 * | 9/2013 | Matsumoto .............. | B25F 5/02 173/171 |
| 8,573,322 | B2 * | 11/2013 | Nagasaka ................ | B25F 5/02 173/171 |
| 9,457,461 | B2 * | 10/2016 | Francis .................... | B25F 5/00 |
| 10,286,539 | B2 * | 5/2019 | Francis ................ | C08F 220/00 |
| 2008/0148915 | A1 * | 6/2008 | Nickels .................... | B27B 9/04 83/469 |

(Continued)

FOREIGN PATENT DOCUMENTS

| | | |
|---|---|---|
| JP | 2016199005 A | 12/2016 |
| WO | 2010077195 A1 | 7/2010 |

*Primary Examiner* — Adam J Waggenspack
(74) *Attorney, Agent, or Firm* — Kilyk & Bowersox, P.L.L.C.

(57) ABSTRACT

A lifting hook 100 (200, 250, 260, 270) has an inner leg 102, an outer leg 104, and a connecting part 106 connecting these legs. With respect to a worker equipped with a lever type carabiner 2(4), the inner leg 102 is located on the inner side close to the carabiner 2(4), and the outer leg 104 is located on the outer side far from the carabiner 2(4). The inner leg 102 and the outer leg 104 relatively have a height difference, and at least a portion 104main of the outer leg 104 is located higher than the inner leg 102.

21 Claims, 43 Drawing Sheets

(56) References Cited

U.S. PATENT DOCUMENTS

| | | | |
|---|---|---|---|
| 2009/0134191 A1* | 5/2009 | Phillips | B25F 5/02 |
| | | | 362/183 |
| 2009/0278012 A1 | 11/2009 | Okouchi et al. | |
| 2011/0108300 A1 | 5/2011 | Nagasaka et al. | |
| 2011/0289786 A1* | 12/2011 | Bijsterveldt | B25F 5/02 |
| | | | 30/514 |
| 2013/0062498 A1* | 3/2013 | Ito | B25F 5/02 |
| | | | 248/672 |
| 2015/0053731 A1 | 2/2015 | Ito et al. | |

* cited by examiner

LIFTING HOOK FOR LOCKING TO CARABINER

BACKGROUND OF THE INVENTION

The present invention relates to a lifting hook for locking a hand-held work tool to a carabiner attached to the body of a worker.

A work tool including a power source such as an electric motor or an internal combustion engine is linked to a worker by using a lifting hook and a carabiner during work or interruption of work. Japanese Laid-Open Patent Publication No. 2015-39328 discloses an example in which a worker wears a harness including a hip pad to use a combination of a lifting hook and a carabiner for linking the harness to a bush cutter. Japanese Laid-Open Patent Publication No. 2011-101919 discloses an example in which a combination of a lifting hook and a carabiner is used to suspend a rechargeable electric work tool from a waist belt of a worker when the tool is not in use.

Several typical examples of conventional lifting hooks manufactured by bending one rod will be described with reference to Japanese Laid-Open Patent Publication No. 2009-269153, WO 2010/077195, and Japanese Laid-Open Patent Publication No. 2016-199005.

Japanese Laid-Open Patent Publication No. 2009-269153 proposes a lifting hook locking a hand-held work tool such as an electric screwdriver or an electric or gas-combustion tacker to a waist belt. This lifting hook is for directly locking to the waist belt.

WO 2010/077195 and Japanese Laid-Open Patent Publication No. 2016-199005 propose lifting hooks locking a work tool to a waist belt via a carabiner or a rope attached to the waist belt, and these hooks have a flat U-shape, are both pivotally assembled to the work tool, and can take a use position projected from the work tool and a retracted position housed in a recess of the work tool.

The lifting hook of WO 2010/077195 is located on a vertical plane when the hook is attached to a work tool. The lifting hook of Japanese Laid-Open Patent Publication No. 2016-199005 is located on a horizontal plane when the hook is attached to a work tool. As used herein, the term "vertical" means, for example, a body height direction, i.e., an up-down direction, when a worker with the carabiner disposed on a waist belt takes a standing posture and holds the work tool in a natural posture. The term "horizontal" means a lateral direction orthogonal to the body height direction. As used herein, the term "natural posture" means a state in which the worker holds the work tool without twisting the wrist.

To distinguish the lifting hooks disclosed in WO 2010/077195 and Japanese Laid-Open Patent Publication No. 2016-199005, the lifting hook of WO 2010/077195 is referred to as a "vertical hook", and the lifting hook of Japanese Laid-Open Patent Publication No. 2016-199005 is referred to as a "horizontal hook".

Available carabiners can roughly be classified into two types. A first type is a "lever type carabiner" including a gate lever. A second type is a "safety lock type carabiner" including a locking mechanism using a screw. The lever type carabiner is employed to link a hand-held work tool to the body of a worker.

The lever type carabiners can roughly be classified into two types depending on a length of a nose defining a gate portion of a carabiner body. Typical examples of carabiners employed for locking a hand-held work tool are shown in FIGS. 29 and 30. A carabiner 2 of FIG. 29 is a "short-nose carabiner". A carabiner 4 of FIG. 30 is a "long-nose carabiner".

Referring to FIG. 29, the short-nose carabiner 2 has a carabiner body 10, a gate lever 14 disposed in a gate portion 12 of the carabiner body 10, and a nose part 16 with which a free end of the gate lever 14 is engaged. The gate lever 14 has a structure providing a spring function, and this spring function constantly urges the gate lever 14 in the closing direction. The long-nose carabiner 4 (FIG. 30) includes substantially the same constituent elements and additionally has a spring member (not shown) urging the gate lever 14. This spring member constantly urges the gate lever 14 of the long-nose carabiner 4 in the closing direction. The short-nose carabiner 2 and the long-nose carabiner 4 have a base end 14a of the gate lever 14 pivotally supported by the carabiner body 10.

As can be seen by comparing FIGS. 29 and 30, the nose part 16 of the short-nose carabiner 2 has a shorter distance L(s) from a locking point 16a for locking the free end of the gate lever 14 to a tip 16b. On the other hand, the long-nose carabiner 4 has a longer distance L(L) from the locking point 16a to the tip 16b, and the nose part 16 from the locking point 16a to the tip 16b, i.e., a nose extension part 18 is curved outward (FIG. 30).

To attach a lifting hook of a work tool to the lever type carabiner and to remove the hook from the carabiner, a worker is required to perform an operation of pushing down and opening the gate lever 14 against the spring force. Operations of the worker holding the work tool employing the vertical hook (WO 2010/077195) or the horizontal hook (Japanese Laid-Open Patent Publication No. 2016-199005) will hereinafter be described with reference to FIGS. 31 to 46.

Combination of Vertical Hook and Short-Nose Carabiner

FIGS. 31 and 32 are views for explaining an operation at the time of attaching a vertical hook 20 to the short-nose carabiner 2. In the figures, "Wk" denotes a worker. "Wb" denotes a waist belt. The vertical hook 20 is disposed on a rear end surface of a work tool TL. The work tool TL shown in the figures is illustrated as a rechargeable electric chainsaw. This chainsaw TL is a top handle type.

FIG. 31 shows a preparation step for attaching the vertical hook 20 to the short-nose carabiner 2. The worker Wk lifts the chainsaw TL and rotates an arm Am and/or a wrist Wr, i.e., twists the arm Am and/or the wrist Wr, to position an upper leg 20u of the vertical hook 20 on the free end of the gate lever 14 and position a lower leg 20d outside the nose part 16.

FIG. 32 shows a step of pushing down the gate lever 14 against the spring force with the upper leg 20u of the vertical hook 20 and inserting the upper leg 20u into the carabiner body 10. This step can be performed by the worker Wk rotating and pushing down the chainsaw TL. As a result, the gate lever 14 is opened against the spring force, and the upper leg 20u can be inserted into the carabiner body 10. The gate lever 14 is then automatically closed by the spring force. By the operation described above, the vertical hook 20 is completely attached to the short-nose carabiner 2, and the chainsaw TL is engaged with the carabiner 2 via the vertical hook 20. Consequently, the chainsaw TL is suspended from the waist of the worker Wk via the carabiner 2.

FIGS. 33 and 34 are views for explaining an operation of detaching the vertical hook 20 locked to the short-nose carabiner 2 from the carabiner 2. FIG. 33 shows a detachment preparation step. The worker Wk moves the arm Am upward to lift the chainsaw TL and then performs an operation of bringing the chainsaw TL closer to the body side of the worker Wk. As a result, the lower leg 20d of the vertical hook 20 can be located on a free end portion of the gate lever 14.

FIG. 34 is a view for explaining an operation of pushing down the lower leg 20d located on the free end portion of the gate lever 14 and inserting the lower leg 20d into the carabiner body 10. This operation is performed by the worker Wk lowering the arm Am and pushing down the chainsaw TL. As a result, both the upper leg 20u and the lower leg 20d can be inserted into the carabiner body 10. Subsequently, by moving the arm Am forward or downward from this state, the vertical hook 20 located inside the carabiner body 10 can be pulled out. By the operation described above, the vertical hook 20 is completely detached from the short-nose carabiner 2, and the chainsaw TL is released from the carabiner 2.

Combination of Horizontal Hook and Short-Nose Carabiner

FIGS. 35 and 36 are views for explaining an operation at the time of attaching a horizontal hook 30 to the short-nose carabiner 2. FIG. 35 shows a preparation step for attaching the horizontal hook 30 to the short-nose carabiner 2. The worker Wk lifts the chainsaw TL and rotates the arm Am or twists the wrist Wr to face the rear end surface of the chainsaw TL toward the body side. A connecting part 30cn connecting ends of an inner leg 30in and an outer leg 30out of the horizontal hook 30 is positioned on the free end portion of the gate lever 14.

FIG. 36 shows a step of inserting the connecting part 30cn of the horizontal hook 30 into the carabiner body 10. This inserting step can be performed by pushing down the chainsaw TL. This causes the connecting part 30cn to open the gate lever 14 against the spring force, and the connecting part 30cn is inserted into the carabiner body 10. As a result, the horizontal hook 30 is completely attached to the short-nose carabiner 2, and the chainsaw TL is engaged with the carabiner 2 via the horizontal hook 30.

FIGS. 37 and 38 are views for explaining an operation of detaching the horizontal hook 30 attached to the short-nose carabiner 2 from the carabiner 2. FIG. 37 shows a detachment preparation step. The worker Wk lifts and rotates the arm Am to position the outer leg 30out of the horizontal hook 30 on the gate lever 14. FIG. 38 shows a step of inserting the outer leg 30out of the horizontal hook 30 into the carabiner body 10. This step can be performed by pushing down the chainsaw TL with the arm Am. As a result, both the inner leg 30in and the outer leg 30out can be inserted into the carabiner body 10. Subsequently, by moving the arm Am forward from this state, the horizontal hook 30 located inside the carabiner body 10 can be pulled out. As a result of the operation, the horizontal hook 30 is completely detached from the short-nose carabiner 2, and the chainsaw TL is released from the carabiner 2.

Combination of Vertical Hook and Long-Nose Carabiner

FIGS. 39 and 40 are views for explaining an operation at the time of attaching the vertical hook 20 to the long-nose carabiner 4. FIG. 39 shows an attachment preparation step. The worker Wk lifts the rear end surface of the chainsaw TL and twists the arm Am and/or the wrist Wr to position the lower leg 20d of the vertical hook 20 on the free end of the gate lever 14 and position the upper leg 20u outside the nose extension part 18.

FIG. 40 shows a step of pushing down the gate lever 14 with the lower leg 20d of the vertical hook 20 to insert the lower leg 20d into the carabiner body 10. This step can be performed by the worker Wk pushing down the chainsaw TL. By this operation, the vertical hook 20 is completely attached to the long-nose carabiner 4, and the chainsaw TL is engaged with the carabiner 4 via the vertical hook 20.

FIGS. 41 to 43 are views for explaining an operation of detaching the vertical hook 20 locked to the long-nose carabiner 4 from the carabiner 4. FIG. 41 shows a detachment preparation step. Referring to FIG. 41, first, the worker Wk lifts the chainsaw TL to raise the upper leg 20u of the vertical hook 20 along the nose extension portion 18 so that the upper leg 20u then climbs over the nose extension portion 18. FIGS. 42 and 43 show a step of inserting the upper leg 20u into the carabiner body 10. This step is performed by pushing down the free end portion of the gate lever 14 with the upper leg 20u. Specifically, the worker Wk pushes down the chainsaw TL to open the gate lever 14 against the spring force with the upper leg 20u, and the upper leg 20u can then be inserted into the carabiner body 10 (FIG. 43). Subsequently, by moving the arm Am forward, the vertical hook 20 located inside the carabiner body 10 can be pulled out. By the operation described above, the vertical hook 20 is completely detached from the long-nose carabiner 4, and the chainsaw TL is released from the carabiner 20.

Combination of Horizontal Hook and Long-Nose Carabiner

FIGS. 44 and 45 are views for explaining an operation at the time of attaching the horizontal hook 30 to the long-nose carabiner 4. FIG. 44 shows an attachment preparation step. The worker Wk lifts and brings the chainsaw TL closer to the body side so that the horizontal hook 30 climes over the nose extension part 18 (FIG. 44). The chainsaw TL is then pushed down to open the gate lever 14 against the spring force (FIG. 45), and the horizontal hook 30 is inserted into the carabiner body 10. When this is finished, the gate lever 14 automatically returns to the closed state due to the spring force. By this series of operations, the horizontal hook 30 is completely attached to the long-nose carabiner 4, and the chainsaw TL is engaged with the long-nose carabiner 4 via the horizontal hook 30.

FIG. 46 is a view for explaining an operation of detaching the horizontal hook 30 locked to the long-nose carabiner 4 from the carabiner 4. The worker Wk lifts the chainsaw TL to raise the outer leg 30out of the horizontal hook 30 along the nose extension part 18 and moves the outer leg 30out by rotating the wrist Wr upward and sideways, i.e., by a twisting motion of the wrist Wr, to climb over the nose extension part 18. The outer leg 30out is positioned on the free end of the gate lever 14 and is then pushed down. Specifically, the worker Wk pushes down the chainsaw TL to open the gate lever 14 with the outer leg 30out and inserts the outer leg 30out into the carabiner body 10. Subsequently, by moving the arm Am forward, the horizontal hook 30 located in the carabiner body 10 can be pulled out. By the operation described above, the horizontal hook 30 is completely detached from the long-nose carabiner 4, and the chainsaw TL is released from the carabiner 4.

As described above, to lock/detach the conventional vertical or horizontal hook 20, 30 to/from the short-nose or long-nose carabiner 2, 4, the worker Wk needs to perform an up-down motion and a rotating motion of the arm (arm twisting motion) and an up-down motion or left/right rotating motion of the wrist Wr (wrist twisting motion). Explaining an example of a situation where the chainsaw illustrated as the work tool TL is locked to the carabiner 2, 4, when pruning and trimming a tree, a worker Wk climbs the tree by using a rope etc. and performs a work while moving on the tree. When the chainsaw is not used, the worker Wk moves, or performs another work, while the chainsaw is locked to the carabiner 2, 4 on a waist belt Wb. In such an unstable state, it is required to simplify the motions of the arm Am, a hand Hd, and the wrist Wr related to the operation of the worker Wk locking/detaching the hook 20, 30 to/from the carabiner 2, 4 as much as possible.

SUMMARY OF THE INVENTION

An object of the present invention is to provide a lifting hook capable of simplifying a worker's motion for locking to/detaching from a carabiner attached to the worker's body to reduce a burden of the worker.

According to one aspect of the present invention, the technical problem described above is solved by providing a lifting hook comprising:

an inner leg (102) and an outer leg (104) fixed to a work tool (TL) with a power source; and a connecting part (106) connecting free ends of the inner and outer legs to each other, wherein when a worker equipped with a lever-type carabiner (2, 4) holds the work tool (TL), the inner leg (102) of the lifting hook is located on the inner side close to the carabiner (2, 4) while the outer leg (104) is located on the outer side far from the carabiner (2, 4), wherein the inner leg (102) and the outer leg (104) have a height difference (H) so that at least a portion of the outer leg (104) is located higher than the inner leg (102), and wherein since the inner leg (102) and the outer leg (104) have a height difference (H), the inner leg (102), the connecting part (106), and the outer leg (104) form a three-dimensional shape.

According to another aspect of the present invention, the present invention can be defined by a lifting hook comprising:

an inner leg (102) and an outer leg (104) fixed to a work tool (TL) with a power source; and a connecting part (106) connecting free ends (102*a*, 104*a*) of the inner and outer legs (102, 104) to each other, wherein when a worker equipped with a lever-type carabiner (2, 4) holds the work tool (TL) in a natural posture without twisting the wrist, the inner leg (102) of the lifting hook is located on the inner side close to the carabiner (2, 4) while the outer leg (104) is located on the outer side far from the carabiner (2, 4), and wherein the inner leg (102) and the outer leg (104) have a height difference (H) so that at least a portion of the outer leg (104) is located higher than the inner leg (102).

Effects and other objects of the present invention will become apparent from the following detailed description of preferable examples of the present invention.

DETAILED DESCRIPTION OF THE PRESENT INVENTION

Preferable embodiments of the present invention will now be described with reference to the accompanying drawings. Prior to the description, an overview of one embodiment will be described with reference to FIGS. 1 to 7. In the following description, for example, based on a carabiner attached to the worker's body via a waist belt or a harness, a direction toward the carabiner (the worker's body) is indicated by "IN"; a direction away from the carabiner (the worker's body) is indicated by "OUT"; and an upward direction and a downward direction of the up-down directions of the carabiner (body height directions of the worker) are indicated by "UP" or "upward" and "DOWN" or "downward", respectively.

The inventors of the present application studied and analyzed conventional vertical and horizontal hooks 20 and 30 in terms of motions of a worker locking/detaching the hooks 20, 30 to/from a carabiner. In the following description, a plane extending in the body height direction of the worker holding a work tool, i.e., the up-down direction, is referred to as a "vertical plane", and a plane orthogonal to the vertical plane is referred to as a "horizontal plane". The conventional vertical hook 20 assembled to a work tool is arranged in the vertical plane. On the other hand, the conventional horizontal hook 30 is arranged in the horizontal plane. The present inventors got an idea assembling a lifting hook to a work tool so as to locate the lifting hook in an inclined plane inclined relative to the horizontal plane and thereby providing a height difference between an inner leg on the side close to the carabiner and an outer leg on the far side so that the outer leg is located at a relatively high position. Based on a hypothesis that this can be expected to reduce a worker's motion, especially, a twist of the wrist, at the time of locking/detaching a hook to/from a carabiner, a U-shaped lifting hook 100 was actually disposed in an inclined plane to verify the worker's motion.

Figure 1:
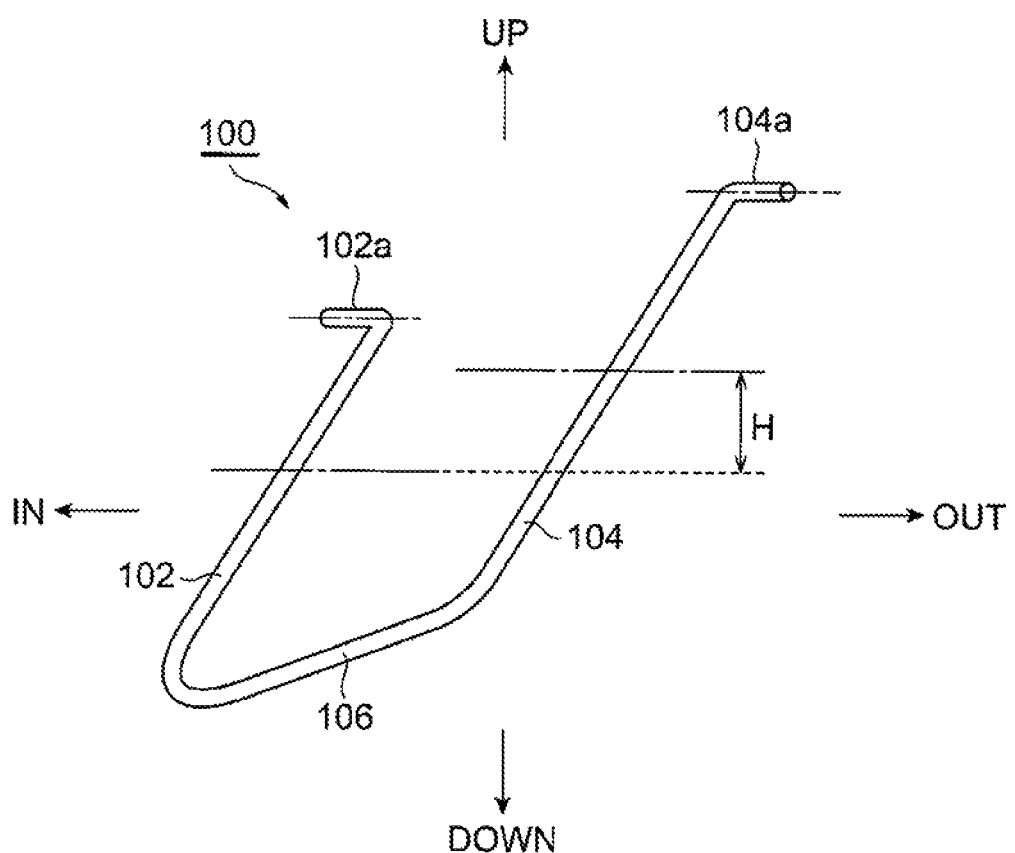
FIG. 1 shows a perspective view of a lifting hook of an embodiment.
Figure 2:
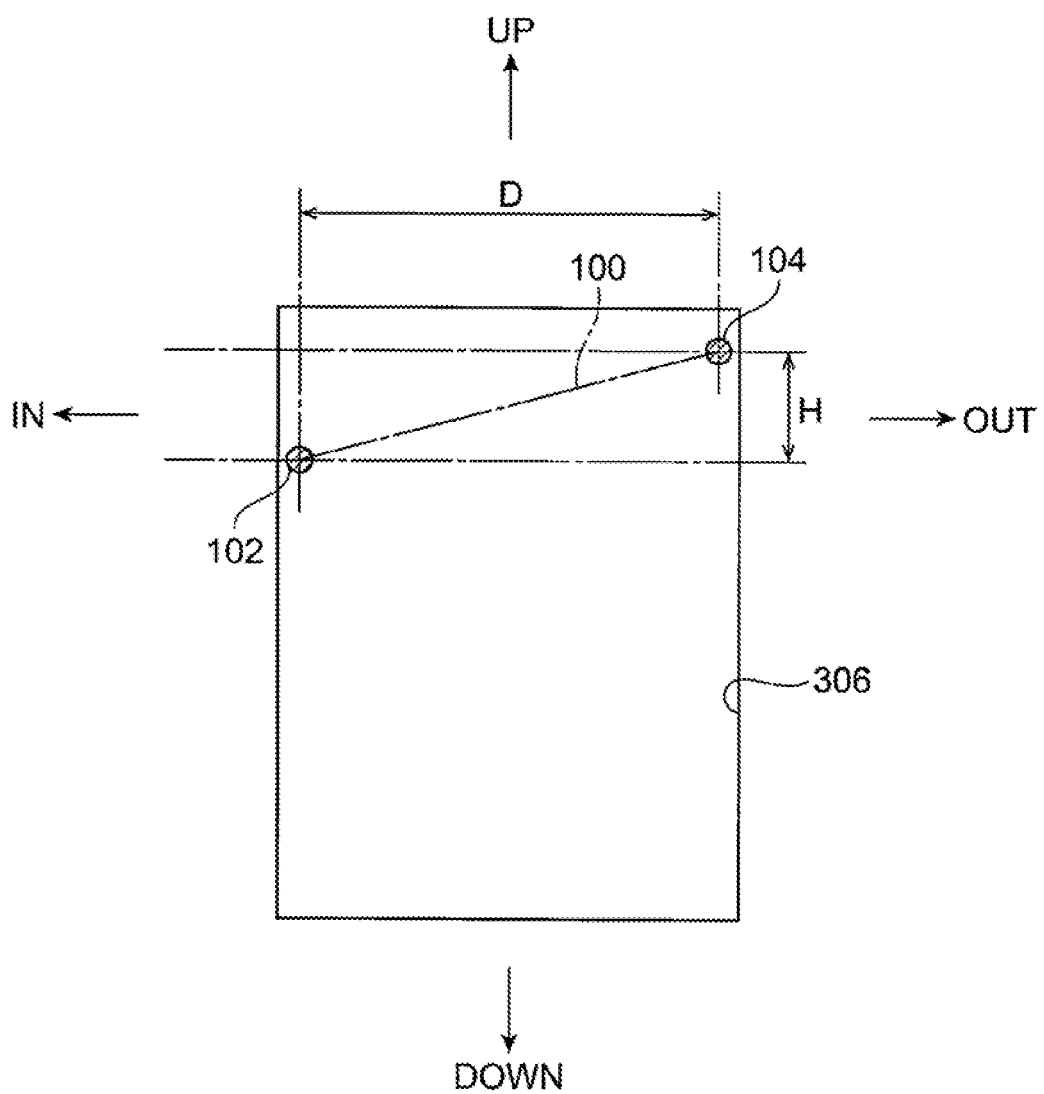
FIG. 2 shows a cross-sectional view of the lifting hook of the embodiment.
Figure 3:
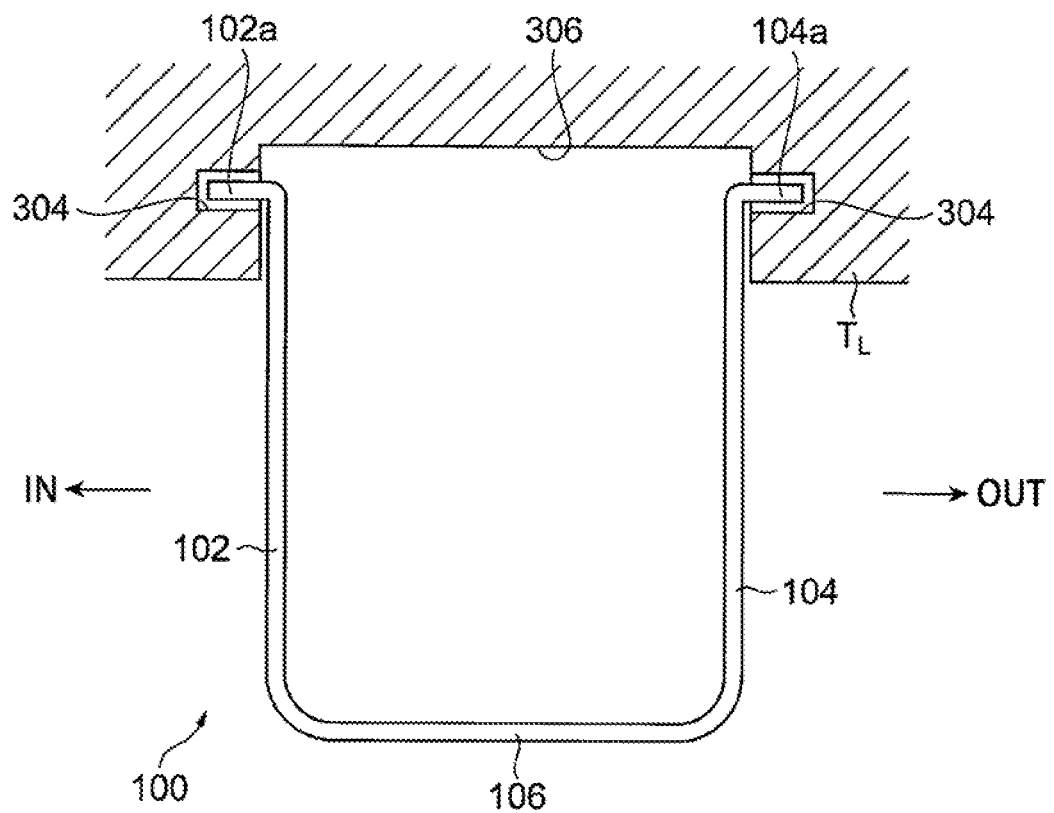
FIG. 3 shows a plan view of the lifting hook of the embodiment assembled to a work tool.

FIGS. 1 to 3 show the U-shaped lifting hook 100. The hook 100 of the embodiment has an inner leg 102, an outer leg 104, and a connecting part 106 connecting free ends of the inner leg 102 and the outer leg 104. The lifting hook 100 is assembled to a work tool and located in the inclined plane described above. In the lifting hook 100 located in the inclined plane, the inner leg 102 is located on the side close to the worker (carabiner), and the outer leg 104 is located on the side far from the carabiner. The outer leg 104 is located at a higher position than the inner leg 102. Reference numeral "H" denotes a height difference between the inner leg 102 and the outer leg 104. FIG. 2 is a cross-sectional view of the lifting hook 100. Reference numeral "D" denotes a separation distance between the inner leg 102 and the outer leg 104 when the hook 100 is viewed from above.

Referring to FIG. 3, a base end portion of the inner leg 102 is made up of an end 102a bent toward a body side, while a base end portion of the outer leg 104 is made up of an end 104a bent outward. The two bent ends 102a, 104a are inserted into a pair of attachment holes 304 of a work tool TL.

Figure 4:
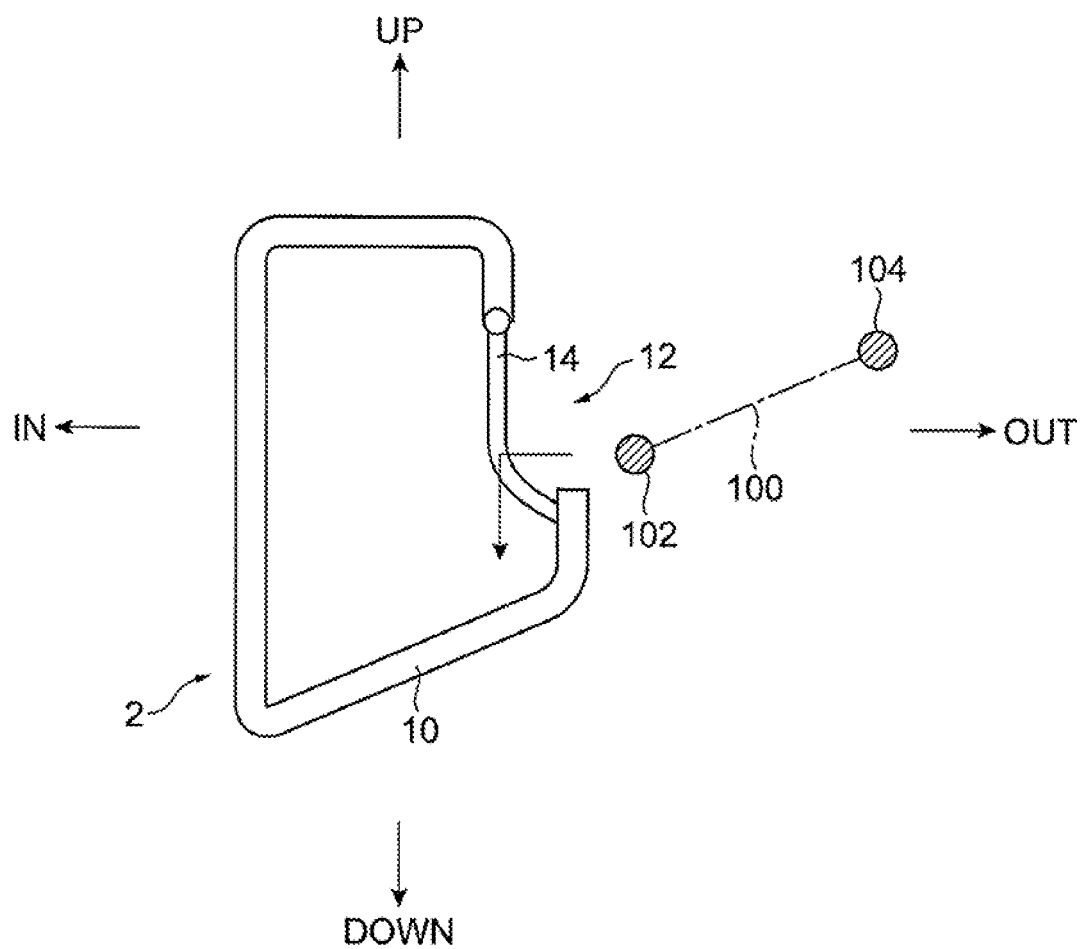
FIG. 4 shows a view for explaining an operation at the time of attaching a lifting hook to a carabiner when the lifting hook of the embodiment is applied to a short-nose carabiner.
Figure 5:
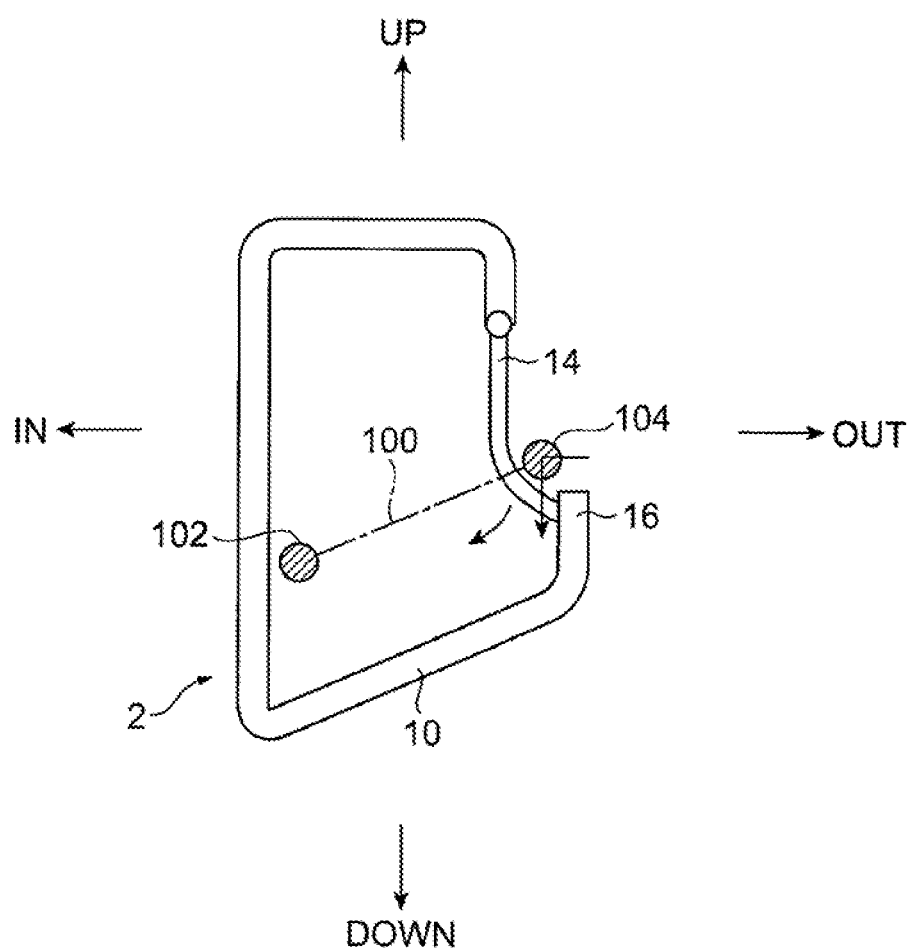
FIG. 5 shows a view for explaining an operation at the time of detaching a lifting hook from a carabiner when the lifting hook of embodiment is applied to a short-nose carabiner.

FIGS. 4 and 5 are views for explaining an operation related to locking/detaching of the lifting hook 100 to/from a short-nose carabiner 2. FIG. 4 is a view for explaining an operation when the lifting hook 100 is attached to the carabiner 2. As indicated by an arrow, the worker moves the work tool TL in the direction toward the carabiner 2, i.e., the worker's body, to bring the inner leg 102 into contact with a gate lever 14 constantly urged in a closing direction and then pushes down the hook 100 to put the inner leg 102 into the carabiner 2 while opening the gate lever 14 against the spring force with the inner leg 102. As a result, the worker can attach the hook 100 to the short-nose carabiner 2 by moving the lifting hook 100 in the up-down and left-right directions via the work tool TL.

FIG. 5 is a view for explaining an operation when the lifting hook 100 is detached from the short-nose carabiner 2. The worker moves the work tool TL in the direction toward the body to bring the outer leg 104 into contact with the gate lever 14. The worker can then move the hook 100 downward via the work tool TL to open the gate lever 14 with the outer leg 104 against the spring force and put outer leg 104 into the carabiner body 10. By moving the work tool TL forward from this state, the lifting hook 100 located inside the carabiner body 10 can be pulled out. By the operation described above, the lifting 100 is completely detached from the short-nose carabiner 2, and the work tool TL can be released from the carabiner 2.

The lifting hook 100 can be attached to and detached from the carabiner 2 by the operation related to the short-nose carabiner 2, i.e., by simply moving the work tool TL in the up-down and left-right directions. In other words, the worker first visually or gropingly confirms the short-nose carabiner 2 and then attaches and detaches the lifting hook 100 without a motion such as "excessively" twisting an arm Am or a wrist Wr. As used herein, the term "excessively" means a twist of the arm Am or the wrist Wr at about 30° or less, which is not a burden to the worker. Preferably, this means that the arm Am and the wrist Wr are "moderately" twisted to attach and detach the lifting hook 100. As used herein, the term "moderately" means a twist of the arm Am or the wrist Wr at about 15° or less, which is an optimum motion for the worker. Preferably, the lifting hook 100 can be attached to and detached from the short-nose carabiner 2 without twisting the arm Am or the wrist Wr at all.

Figure 6:
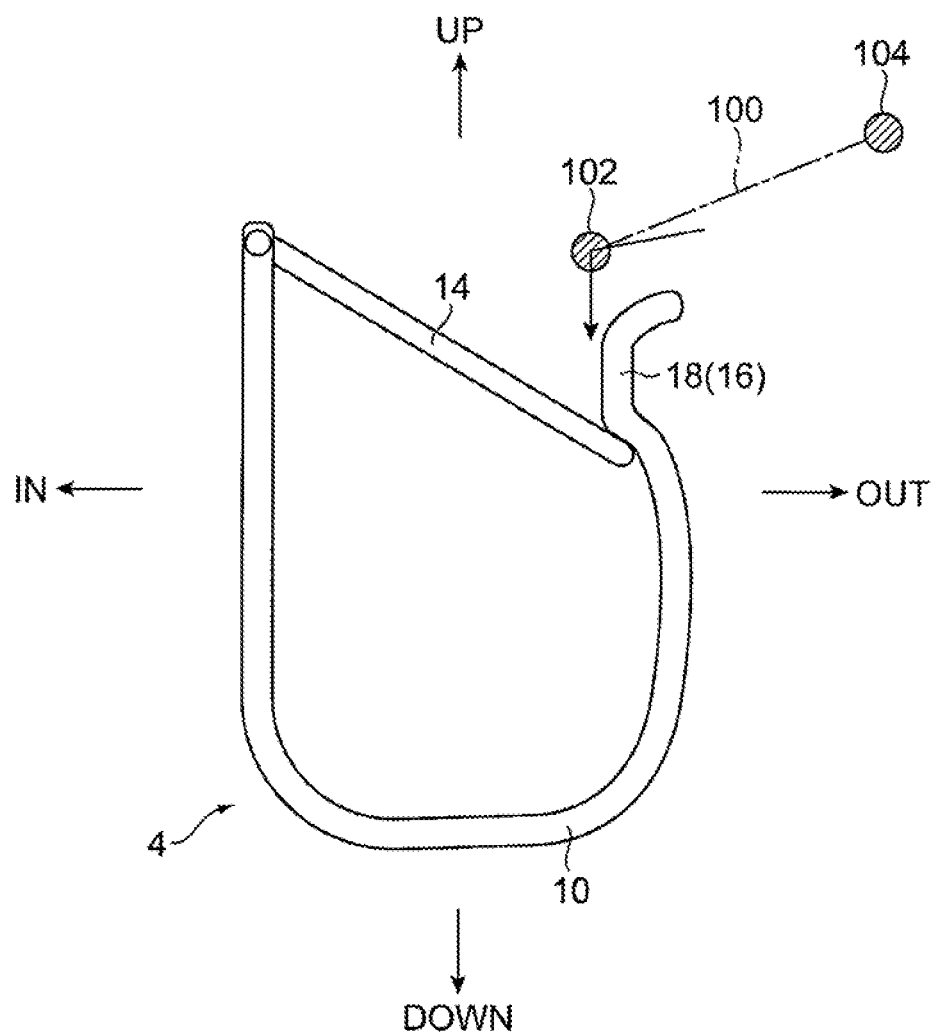
FIG. 6 shows a view for explaining an operation at the time of attaching a lifting hook to a carabiner when the lifting hook of the embodiment is applied to a long-nose carabiner.
Figure 7:
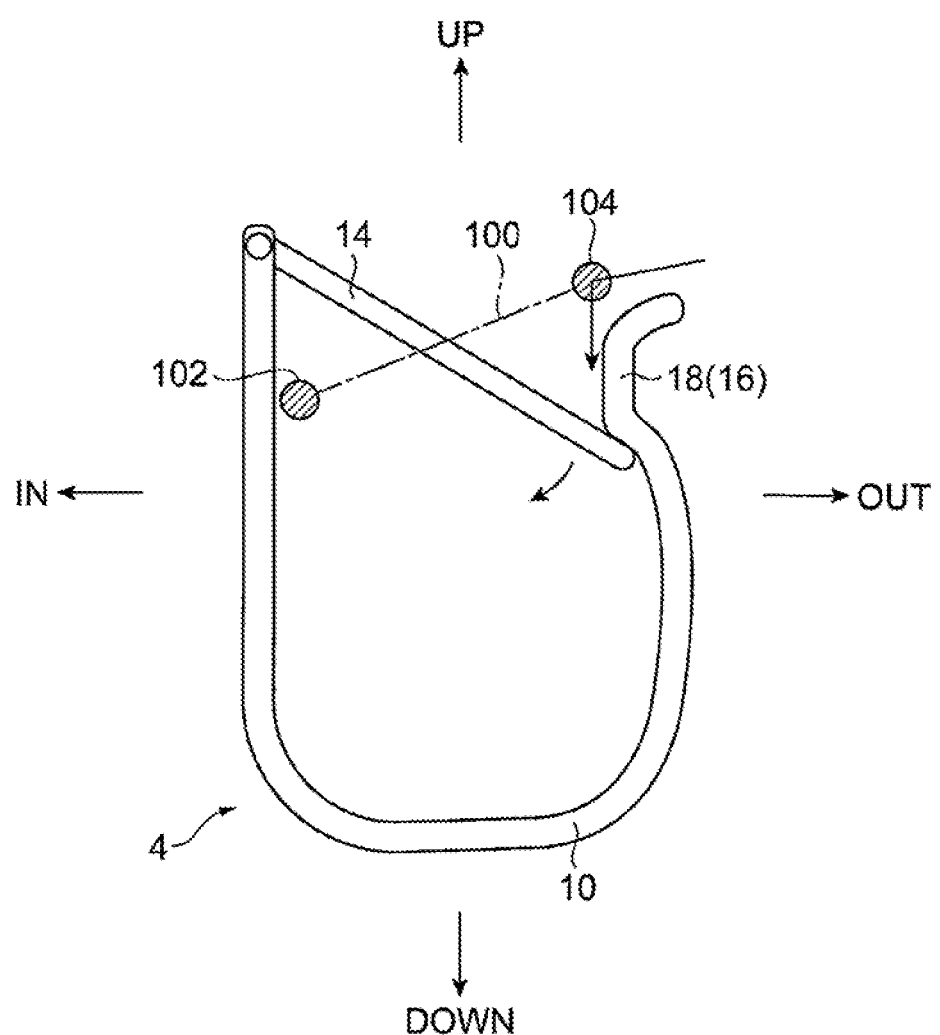
FIG. 7 shows a view for explaining an operation at the time of detaching a lifting hook from a carabiner when the lifting hook of embodiment is applied to a long-nose carabiner.

FIGS. 6 and 7 are views for explaining the operation when the lifting hook 100 is applied to a long-nose carabiner 4. FIG. 6 is a view for explaining an operation when the lifting hook 100 is attached to the carabiner 4. The worker lifts and moves the work tool TL in a lateral direction (toward the body side) to position the inner leg 102 over a nose extension part 18 and above the gate lever 14. Subsequently, by pushing down the work tool TL, the gate lever 14 is opened against the spring force with the inner leg 102, and the inner leg 102 is put into the carabiner body 10. By the operation described above, i.e., by simply moving the work tool TL in the up-down direction and the direction toward the body side, the lifting hook 100 can be attached to the long-nose carabiner 4. In other words, the worker can attach the hook 100 to the carabiner 4 while visually observing the operation, or in a groping manner, without a motion such as excessively twisting the arm Am or the wrist Wr. Preferably, the lifting hook 100 can be attached by moderately twisting the arm Am or the wrist Wr. Preferably, the lifting hook 100 can be attached without a motion such as twisting the arm Am or the wrist Wr at all.

FIG. 7 is a view for explaining an operation when the lifting hook 100 is detached from the long-nose carabiner 4. The worker moves the work tool TL in a direction toward the body to position the outer leg 104 over the nose extension part 18 and above the gate lever 14. In this state, since the outer leg 104 is located relatively higher than the inner leg 102, the outer leg 104 can be positioned over the nose extension portion 18 and above the gate lever 14 by simply performing an operation of bringing the work tool TL closer to the body side of the worker. Subsequently, by moving the work tool TL downward, the gate lever 14 is opened against the spring force with the outer leg 104, and the outer leg 104 is put into the carabiner body 10. By moving the work tool TL forward from this state, the hook 100 located inside the carabiner body 10 can be pulled out. The operation described above is performed under visual observation or in a groping manner. The lifting hook 100 is completely detached from the long-nose carabiner 4 without an operation of rotating the work tool TL, i.e., without an operation of excessively twisting the arm Am or the wrist Wr, and the work tool TL can be released from the carabiner 4. Preferably, the lifting hook 100 can be released by moderately twisting the arm Am or the wrist Wr. Preferably, the lifting hook 100 can be released without a motion such as twisting the arm Am or the wrist Wr at all.

Regarding the long-nose carabiner 4, as with the short-nose carabiner 2, the worker can attach and detach the lifting hook 100 to and from the long-nose carabiner 4 while visually observing the operation, or in a groping manner, without an operation such as twisting the arm Am or the wrist Wr.

In FIG. 1, the connecting part 106 is inclined in the height direction to locate the outer leg 104 higher than the inner leg 102. As in an example described below with reference to FIG. 9, the outer leg 104 may be divided into two sections in the longitudinal direction thereof, and a first portion 104sub adjacent to the connecting part 106 may be inclined, so that a functional main portion 104main is located higher than the inner leg 102. In a modification not shown, a portion adjacent to the connecting part 106 may be inclined in the inner leg 102, so that the outer leg 104 is located higher than the inner leg 102.

The inner leg 102, the outer leg 104, and the connecting part 106 shown as straight lines in FIGS. 1 to 3 may have a curved shape. Alternatively, the inner leg 102, the outer leg 104, and the connecting part 106 may each have a shape acquired by combining a straight line and a curve.

Figure 8A:
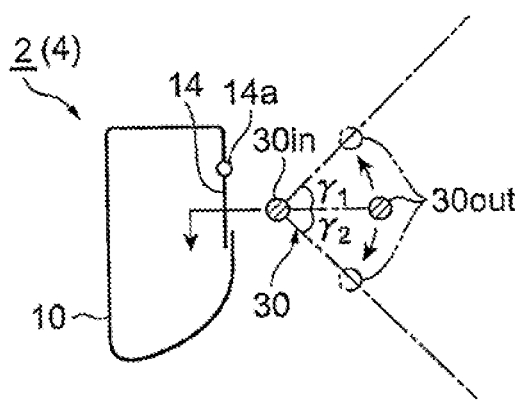
FIG. 8A shows a view for explaining an action of a lifting hook of an exemplary embodiment according to the present invention in comparison with a conventional horizontal hook when the horizontal hook is locked to a short-nose carabiner.
Figure 8B:
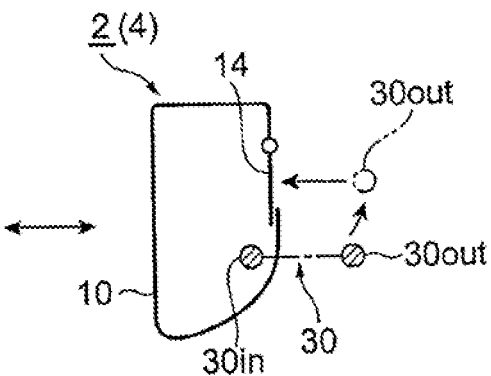
FIG. 8B shows a view for explaining an action of a lifting hook of an exemplary embodiment according to the present invention in comparison with a conventional horizontal hook when the horizontal hook is detached from the short-nose carabiner.
Figure 8C:
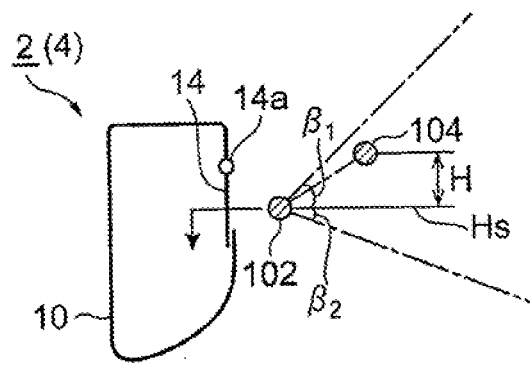
FIG. 8C shows a view for explaining an action of a lifting hook of an exemplary embodiment according to the present invention in comparison with a conventional horizontal hook when the lifting hook of the present invention is locked to the short-nose carabiner.
Figure 8D:
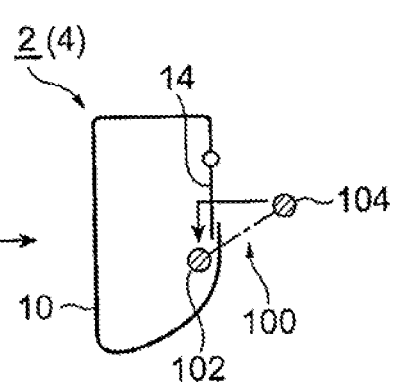
FIG. 8D shows a view for explaining an action of a lifting hook of an exemplary embodiment according to the present invention in comparison with a conventional horizontal hook when the lifting hook of the present invention is detached from the short-nose carabiner.

FIGS. 8A to 8D are views for explaining an action of the lifting hook 100 of an exemplary embodiment according to the present invention in comparison with a conventional example. FIGS. 8A and 8B illustratively show the action of the conventional horizontal hook 30, FIG. 8A is a view when the hook 30 is locked to the carabiner 2(4), and FIG. 8B is a view when the hook 30 is detached from the carabiner 2(4). FIGS. 8C and 8D show the action of the lifting hook 100 of the embodiment, FIG. 8C is a view when the hook 100 is locked to the carabiner 2(4), and FIG. 8D is a view when the hook 100 is detached from the carabiner 2(4).

Referring to FIG. 8B, when the horizontal hook 30 located in the horizontal plane is detached from the short-nose and/or long-nose carabiner 2(4), the work tool may be displaced in a lateral direction to open the lever 14 with the outer leg 30out. In this case, it is necessary to twist the wrist for the horizontal hook 30 depending on the size of the carabiner 2(4). It may also be necessary to twist the wrist to incline the horizontal hook 30 upward or downward so as to put the outer leg 30out inside the body 10. This inclination angle is indicated by $\gamma 1$ and $\gamma 2$ (FIG. 8A). The inclination angles $\gamma 1$, $\gamma 2$ vary depending on the size of the horizontal hook 30 and the size of the carabiner 2, 4.

With reference to FIGS. 8C and 8D, the hook 100 of the embodiment has a height difference H between the inner leg 102 and the outer leg 104 and is therefore designed to reduce the twist, or preferably, to eliminate the need for the twist. For example, when the conventional horizontal hook 30 is detached from the carabiner 2(4), it is necessary to twist the wrist to lift the outer leg 30out (FIG. 8B); however, this is not necessary for both locking and detaching the hook 100 of the embodiment (FIG. 8D). Although it may be necessary to twist the wrist depending on the size of the hook 100, a value of the height difference H, and the size of the carabiner 2, upward and downward angles $\beta 1$, $\beta 2$ from a horizontal plane Hs for twisting the wrist to incline the lifting hook 100 may be smaller than the conventional angles γ1, γ2.

Although the horizontal hook 30 has been illustrated, the same applies to the vertical hook 20, and it is necessary to twist the wrist to incline the vertical hook 20 at the time of detachment from the carabiner 2(4).

The necessity of twisting the wrist to detach the hook 100 of the embodiment of the present invention from the carabiner 2 or 4 depends on the size of the hook 100, the value of the height difference H, and the size of the carabiner 2, 4. In designing of the height difference H and the size of the lifting hook 100, the angle β1 or β2 described above may be about 30°, preferably about 20°, most preferably about 0°. In other words, the height difference H and the hook size of the lifting hook 100 may be designed such that when the hook 100 of the embodiment of the present invention is locked to or detached from the carabiner 2, 4, the worker twists the wrist to rotate the work tool by an angle of 35° or less, preferably 25° or less, and most preferably about 0° to 10°.

Figure 9:
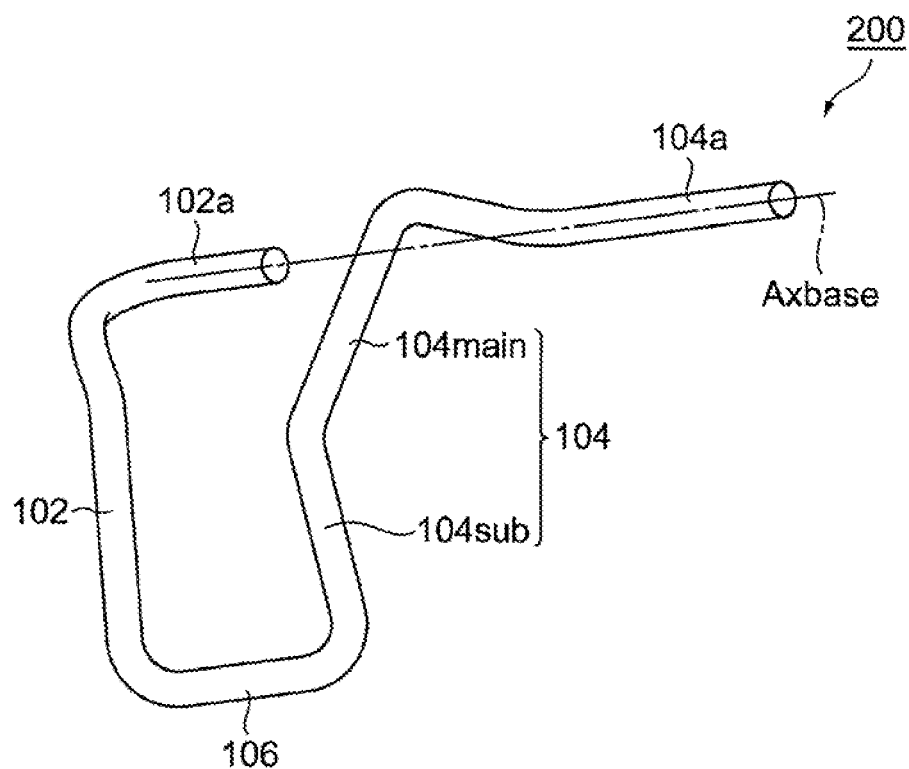
FIG. 9 shows a perspective view of a lifting hook of an example.
Figure 10:
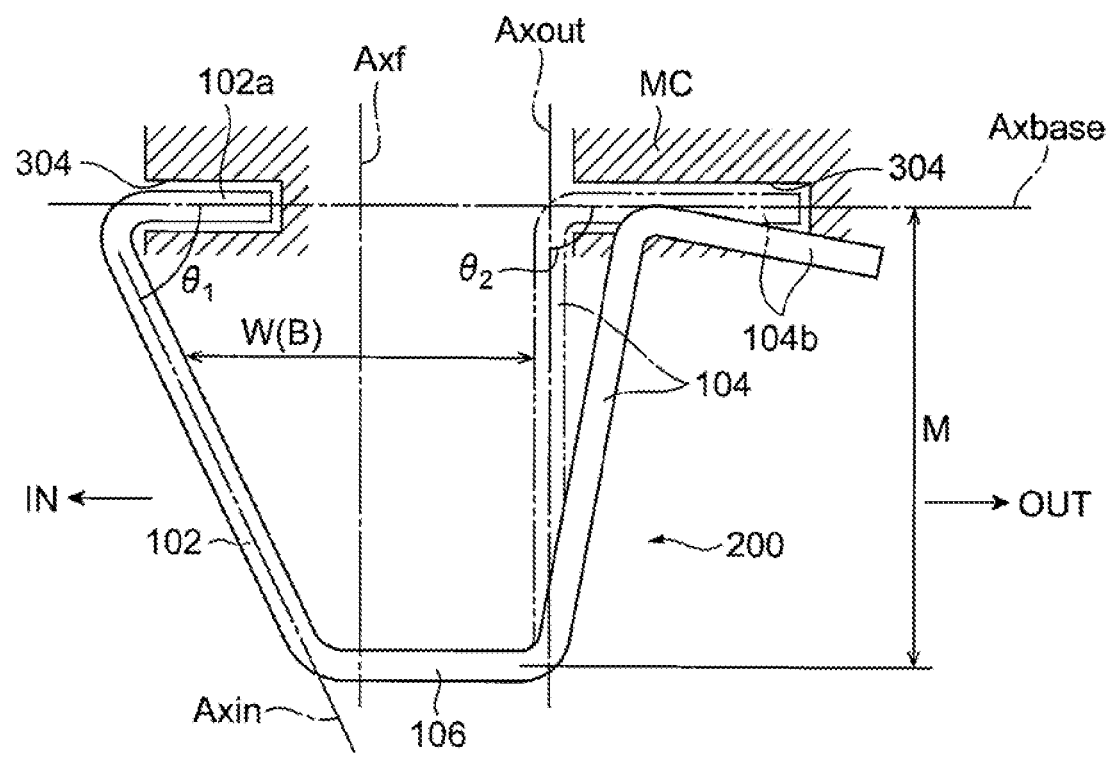
FIG. 10 shows a plan view of the lifting hook of the example.
Figure 11:
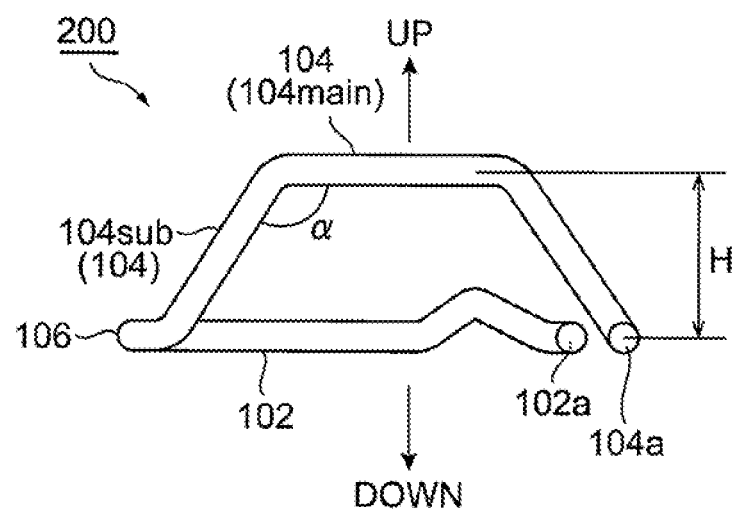
FIG. 11 shows a side view of the lifting hook of the example.

FIGS. 9 to 11 show a lifting hook 200 of a preferable example. In the description of the lifting hook 200 of the example, the same reference numerals are used for substantially the same elements as those of the lifting hook 100 described with reference with FIG. 1 etc. FIG. 9 is a perspective view. FIG. 10 is a plan view. FIG. 11 is a side view of the lifting hook 200 placed on a horizontal plane. The lifting hook 200 is made by bending a lot having a circular cross section. As can be seen best in FIG. 11, each of the inner leg 102, the outer leg 104, and connecting part 106 have a respective length. The length of the inner leg 102 is disposed along a first plane, and at least a portion of the length of the outer leg 104 is disposed along a second plane that is elevated above the first plane relative to a horizontal axis of a rear end surface of a work tool (see FIG. 14). Additionally, at least one of the respective lengths of the inner leg 102, the connecting part 106, and the outer leg 104 is disposed along a plane that is at an angle relative to the horizontal axis of the rear end surface of the work tool. Accordingly, the lifting hook 200 is formed into a three-dimensional shape with base elements of the lifting hook 200, i.e., the inner leg 102, the outer leg 104, and the connecting part 106, associated with each other such that the outer leg 104 is located at a relatively high position. As a result, a degree of twist of the wrist can be reduced particularly when the worker detaches the hook from the carabiner. In other words, the degree of twist of the wrist can be reduced as compared to those having a non-three-dimensional shape. This three-dimensional shape is formed to be easily detachable in accordance with the size and shape of the carabiner and the work tool. Additionally, the lifting hook 200 is formed into a shape not only easily detachable but also easily lockable to the carabiner.

Referring to FIG. 11, the lifting hook 200 has a three-dimensional shape when placed on a horizontal plane and viewed from the side, and the bent end 102a of the inner leg 102 and the bent end 104a of the outer leg 104 are located on the same horizontal plane. The inner and outer bent ends 102a, 104a form a pivot axis Axbase of the lifting hook 200 when inserted and assembled in the attachment holes 304 of the work tool TL. The lifting hook 200 can pivot around the pivot axis Axbase to take a use position projected from the work tool TL (FIG. 10) and a retracted position housed in a recess 306 (FIG. 3) of the work tool TL. The lifting hook 200 is shaped such that the inner leg 102 and the outer leg 104 form a height difference with respect to the pivot axis Axbase. Therefore, when the worker locks/detaches the hook to/from the carabiner, the degree of twist of the wrist can be reduced. The shape with the height difference is designed in accordance with the size and shape of the carabiner and the work tool.

A solid line of FIG. 10 shows a state before the outer leg 104 is assembled to the work tool TL. A virtual line of FIG. 10 shows a state after the lifting hook 200 is assembled to the work tool TL. The inner leg 102 of the lifting hook 200 is inclined in a direction toward the outer leg 104, i.e., in a direction away from the worker's body side, from the bent end 102a toward the connecting part 106. This inclination angle is indicated by reference numeral "θ1". As a result, the lifting hook 200 has a tapered shape in planar view.

Referring to FIG. 11, the connecting part 106 extends in the lateral direction. The outer leg 104 includes the first portion 104sub functionally constituting a portion of the connecting part 106, and the functional main portion 104main continuing from the first portion 104sub and located at a higher position to functionally constitute a main part, and the functional main portion 104main has a linear length. An angle between the first portion 104sub and the functional main portion 104main is indicated by reference numeral "α". The functional main portion 104main having a length is made up of a straight line substantially parallel to the inner leg 102 when viewed from the side.

The dimensions or angles of the parts of the lifting hook 200 of the example are listed as examples as follows.
(1) Projection length M of the hook 200 (FIG. 10): 40 mm
(2) Height difference H between the inner and outer legs 102, 104 (FIG. 11): 13 mm (3) Inclination angle θ1 of the inner leg 102 (FIG. 10): 65°
(4) Width W(B) of the base end portion of the hook 200 (FIG. 10): 35 mm
(5) Side-view included angle α between the first portion 104sub and the functional main portion 104main of the outer leg 104 (FIG. 11): 130°

The height difference H of the above (2) may be 2 mm or more and 50 mm or less so as to eliminate the need for twisting the wrist excessively (for example, at 35°) at the time of locking/detaching of the lifting hook. Preferably, the height difference H may be 5 mm or more and 30 mm or less so that the wrist is optimally twisted, for example, a twisting operation of 25° or less is sufficient. Most preferably, the height difference H may be 8 mm or more and 15 mm or less so that the twist of the wrist is almost not required (0° to 10°). When the hook 200 is detached from the carabiner 2, 4, it is necessary to open the gate lever 14 against the spring force with the functional main portion 104main of the outer leg 104 while the inner leg 102 is inside the hook body 10. Depending on the size of the carabiners 2, 4, if the height difference H is too large, it becomes difficult to open the gate lever 14 with the outer leg 104, and when the hook 200 is retracted into the work tool TL, the hook 200 may not be housed unless the housing recess 306 (FIG. 3) is made deeper.

When the lifting hook 200 is placed on a horizontal plane, the pivot axis Axbase formed by the inner and outer bent ends 102a, 104a is located on the horizontal plane, and the lifting hook 200 has a three-dimensional shape with the height difference H between the inner leg 102 and the functional main portion 104main of the outer leg 104.

Figure 17:
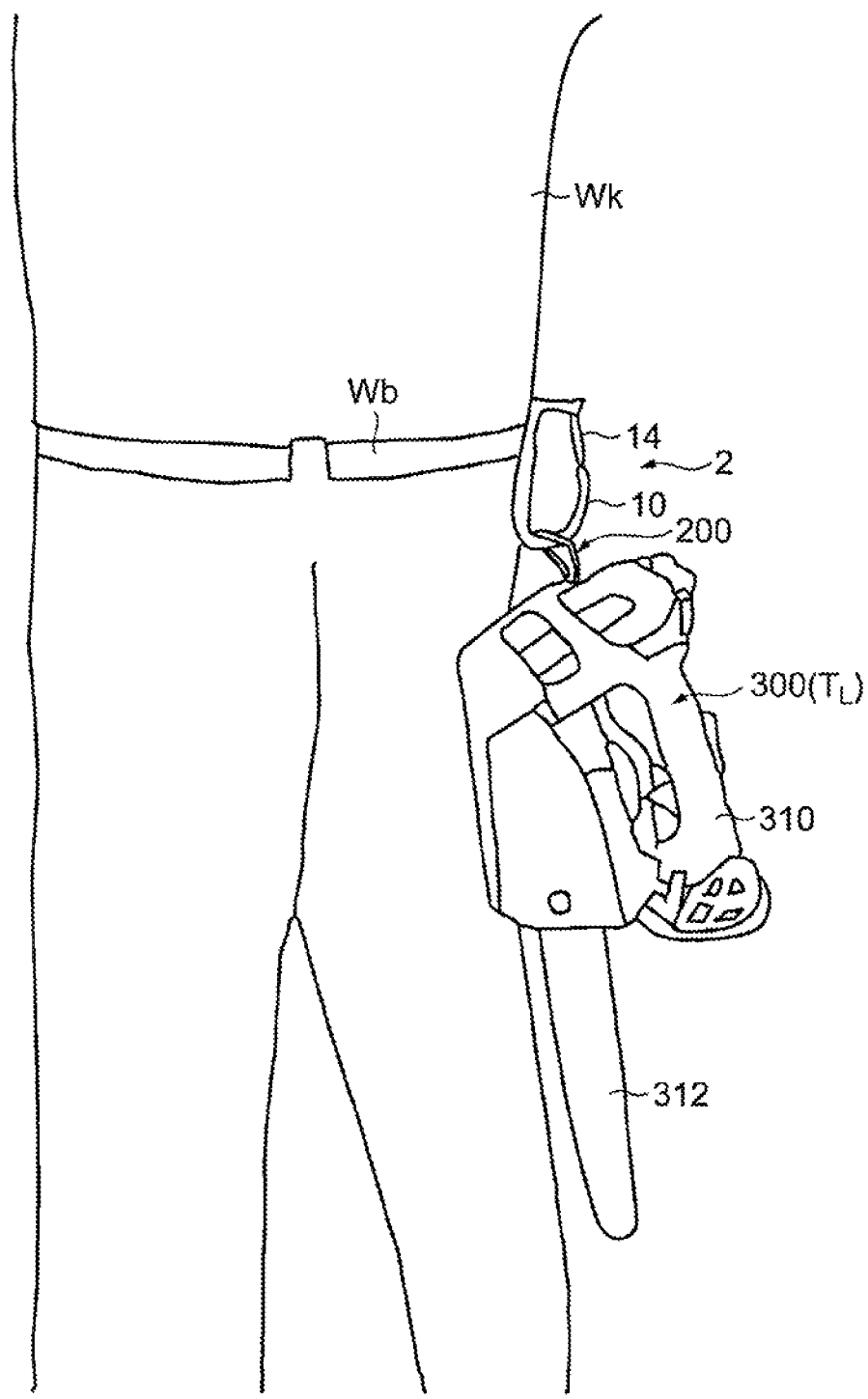
FIG. 17 shows a view for explaining a state in which the chainsaw is suspended from a waist belt of a worker via the lifting hook of the example and the short-nose carabiner.
Figure 20:
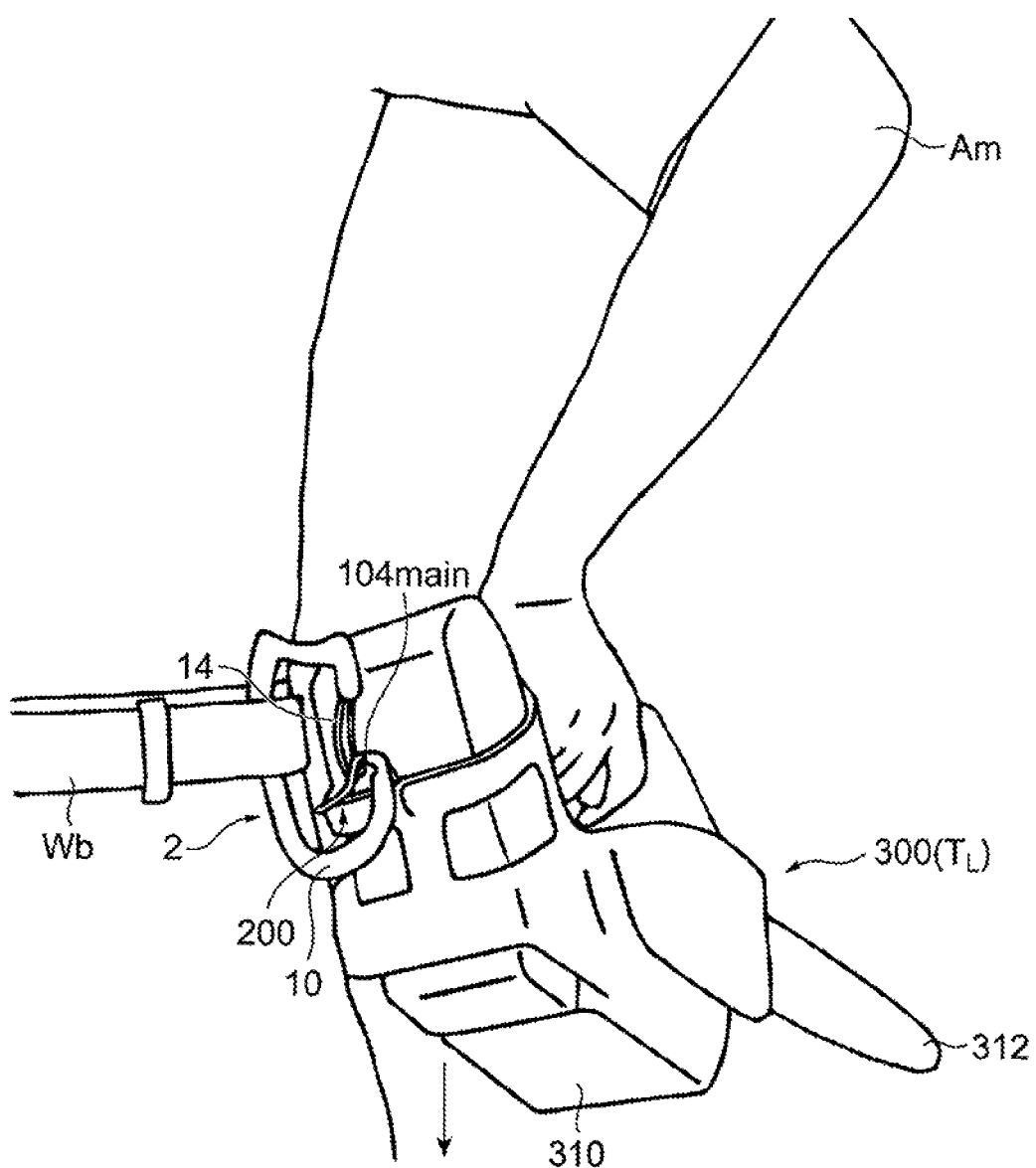
FIG. 20 shows a view for explaining a step of inserting an outer leg of the lifting hook of the example into the short-nose carabiner to detach the lifting hook.
Figure 25:
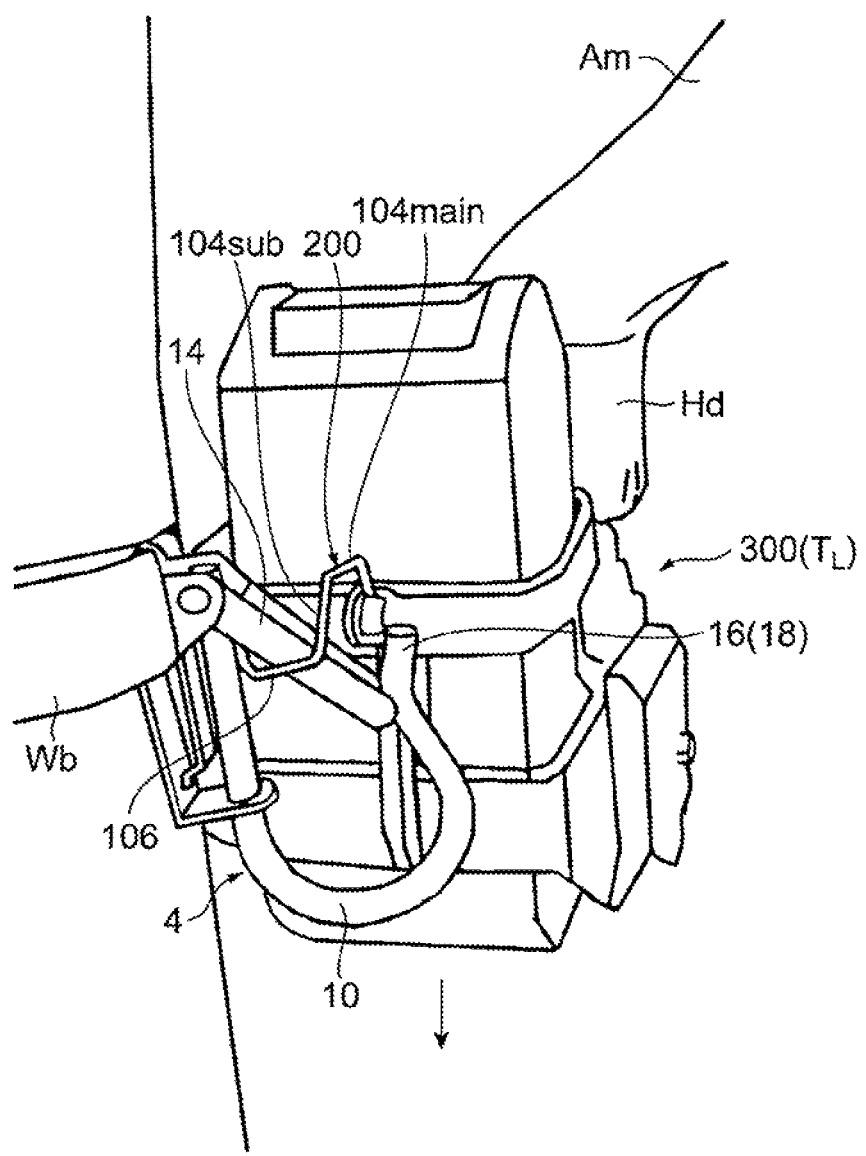
FIG. 25 shows a view for explaining a step of detaching the lifting hook of the example from the long-nose carabiner.

Regarding the inclination angle θ1 (FIG. 10) of the inner leg 102 of the above (3), i.e., the included angle θ1 between the inner leg 102 and the bent end 102a, by setting this angle θ1 to a value smaller than 90°, the hook 200 can be formed into a tapered shape in planar view (see FIG. 10). By forming the hook 200 into a tapered shape in planar view, the range supported by the carabiner 2, 4 is limited when the work tool TL is suspended as shown in FIG. 17, which improves the stability of the work tool TL when the tool is suspended (increases stability when the worker moves). Additionally, at the time of a detachment operation as shown in FIGS. 20 and 25 (when the gate 14 is pushed down by the outer leg 104 or when the functional main portion 104main passes over the nose part 16), a distance can be increased between the inner leg 102 and the worker or the carabiner body 10, so that the operability is improved.

Referring to FIG. 10, when the lifting hook 200 is in the use position, an axis of the hook 200 projected from the work tool TL is indicated by "Axf". An axis Axout of the outer leg 104 is parallel to this axis Axf. An included angle θ2 between the outer leg 104 and the bent end 104a is 90°. The inner leg 102 has an axis Axin inclined relative to the axis Axf of the hook 200. Therefore, the inclination angle θ1 of the inner leg 102 is smaller than 90°, so that the hook 200 has a tapered shape in planar view.

Any one of the following three configurations may be employed for forming the hook 200 into a tapered shape in planar view.
  (a) The inner leg 102 is inclined in planar view so as to intersect with the axis Axf of the hook 200 (FIG. 10).
  (b) The outer leg 104 is inclined in planar view so as to intersect with the axis Axf of the hook 200, thereby making the angle θ2 larger than 90°.
  (c) The inner leg 102 and the outer leg 104 are both inclined in planar view.

The side-view included angle α (FIG. 11) between the first portion 104sub and the functional main portion 104main of the outer leg 104 of the above (5) is related to the operability when the outer leg 104 is moved along the carabiner body 10 under visual observation or preferably in a groping manner. When the included angle α is greater than 90° and at least 170° or less at the time of detachment as shown in FIGS. 20 and 25, the outer leg 104 can be hooked on the gate lever 14 of the carabiner 2, 4 and easily detached. The included angle α is greater than 90° and preferably 150° or less, more preferably 130° or less.

Figure 12:
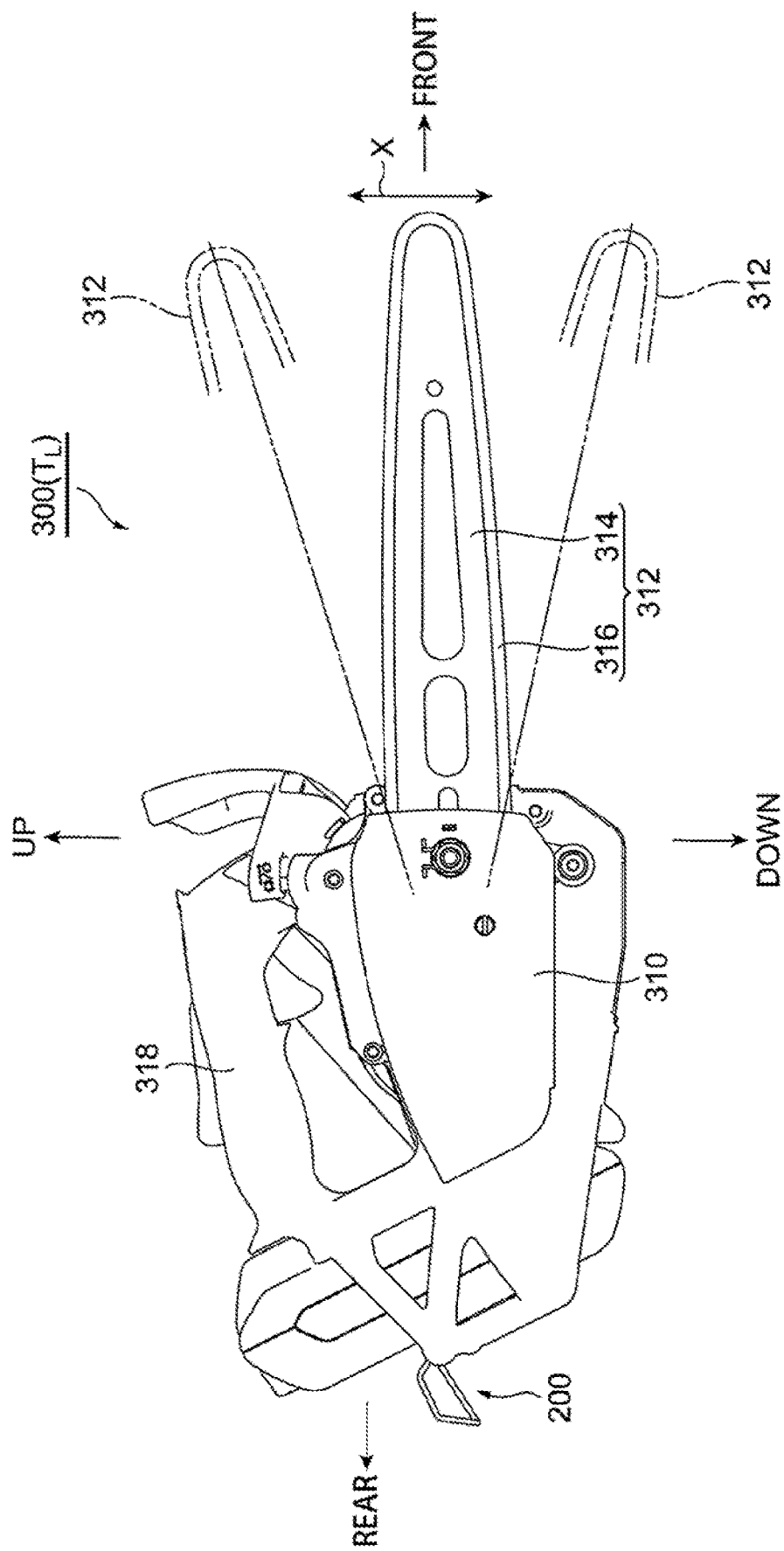
FIG. 12 shows a side view of a chainsaw with the lifting hook of the example assembled thereto.
Figure 13:
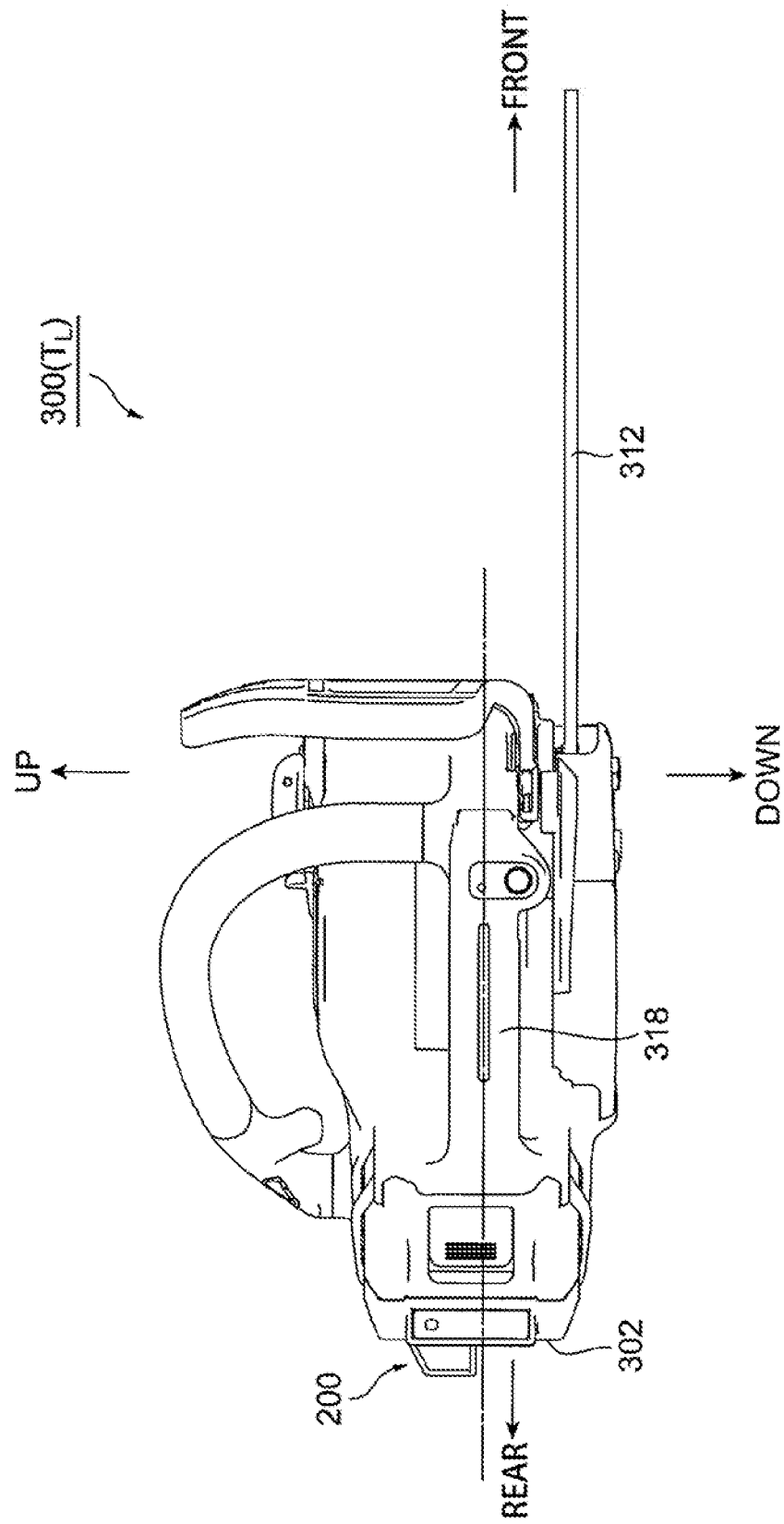
FIG. 13 shows a plan view of the chainsaw with the lifting hook of the example assembled thereto.
Figure 14:
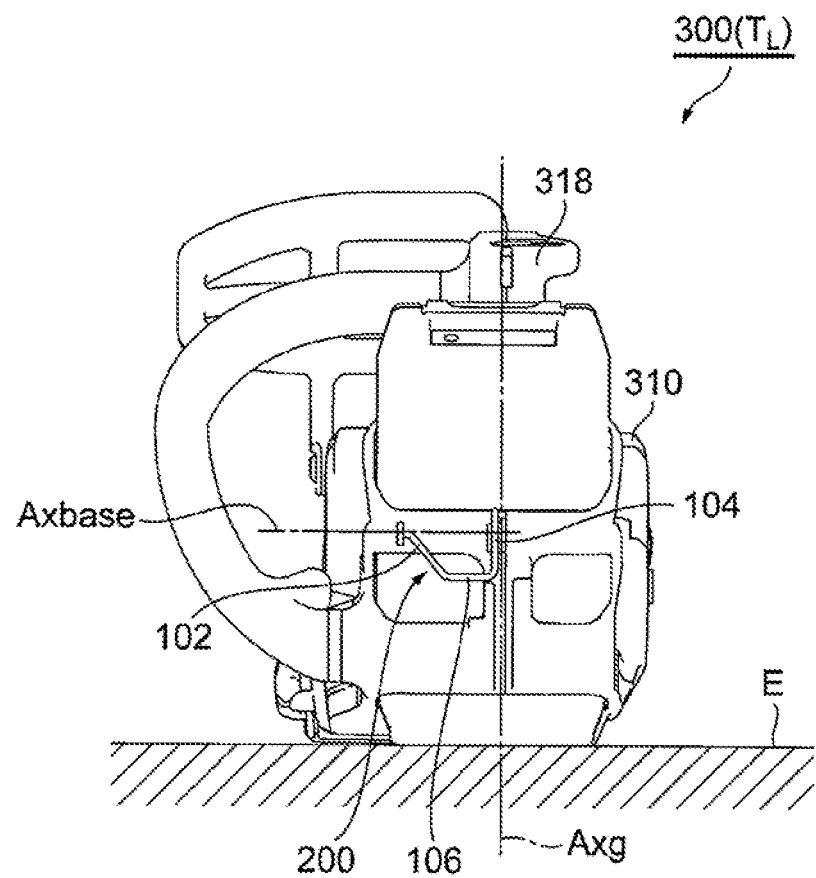
FIG. 14 shows a rear view of the chainsaw with the lifting hook of the example assembled thereto.

An example of the work tool TL equipped with the lifting hook 200 will be described with reference to FIGS. 12 to 14. The work tool TL shown in the figures is a rechargeable electric chainsaw 300. FIG. 12 is a side view of the electric chainsaw 300, FIG. 13 is a plan view, and FIG. 14 is a rear view of the electric chainsaw 300 viewed from the rear side.

The electric chainsaw 300 shown in the figures is already commercially available, and therefore only the overview thereof will be described. The electric chainsaw 300 has a main body 310 and a cutting attachment 312. The attachment 312 includes a guide bar 314 and a saw chain 316 guided by the guide bar 314 when rotated.

A battery is housed in the main body 310 along with a drive source such as a motor and a control unit, and the motor is driven by electric power supplied from the battery. The main body 310 is provided with a center grip 318. This type of the chainsaw 300 is called a "top handle type chainsaw", and the worker Wk can hold the center grip 318 to operate the chainsaw 300.

The lifting hook 200 of the example is assembled to a rear end surface 302 of the chainsaw 300 in a retractable manner. The inner leg 102 can be disposed closer to an inner side of the chainsaw 300 and the outer leg 104 can be disposed closer to the outer side of the chainsaw 300. FIGS. 12 to 14 show a state when the lifting hook 200 is used, and the lifting hook 200 is positioned to project rearward from the rear end surface 302. The chainsaw 300 is moved in directions indicated by an arrow X in FIG. 12, i.e., in directions along a surface of the guide bar 314, when a cutting process is performed.

The locking/detaching of the lifting hook 200 to/from the short-nose carabiner 2 or the long-nose carabiner 4 will hereinafter be described with reference to FIGS. 15 to 25.

Figure 15:
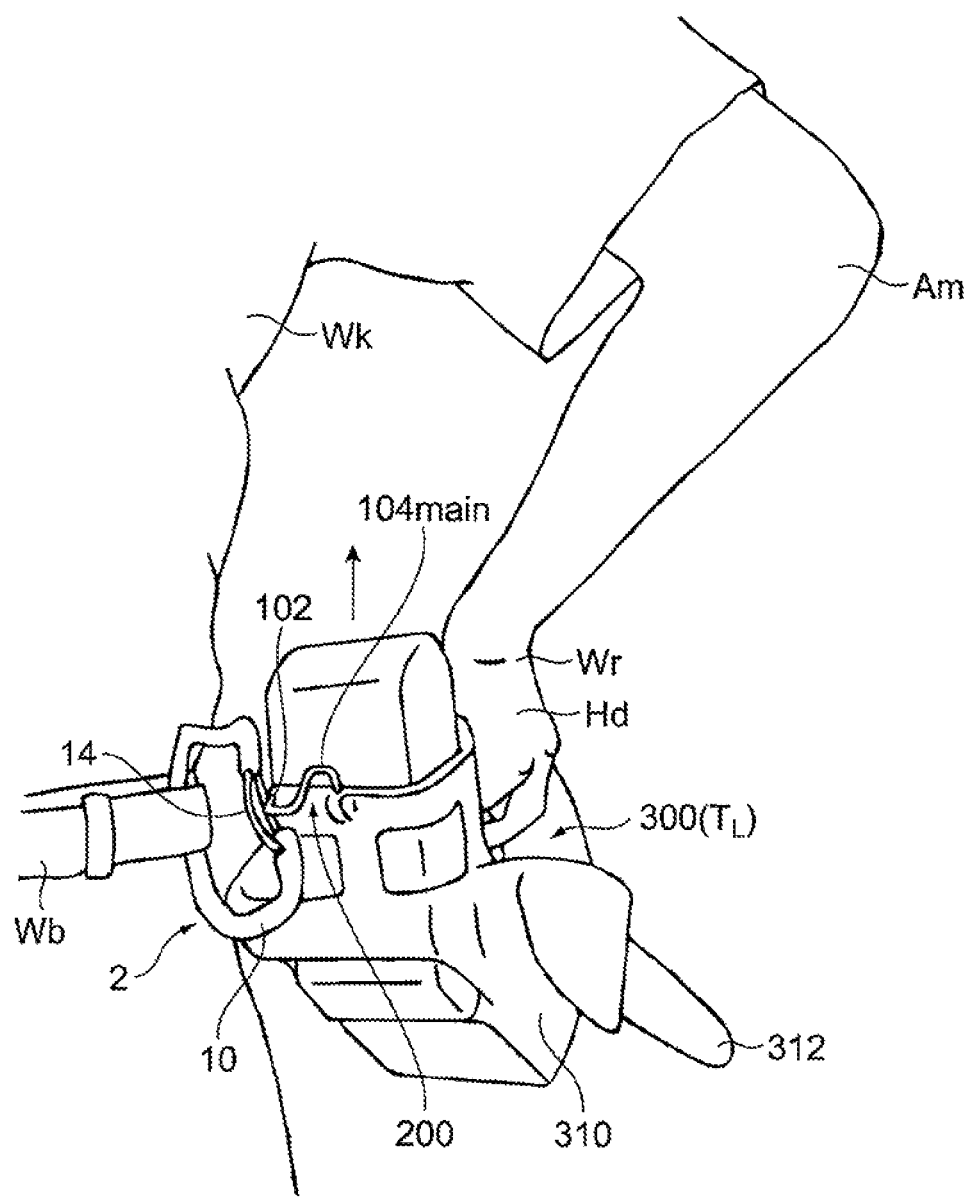
FIG. 15 shows a view for explaining a preparation step of attaching the lifting hook of the example to a short-nose carabiner.
Figure 16:
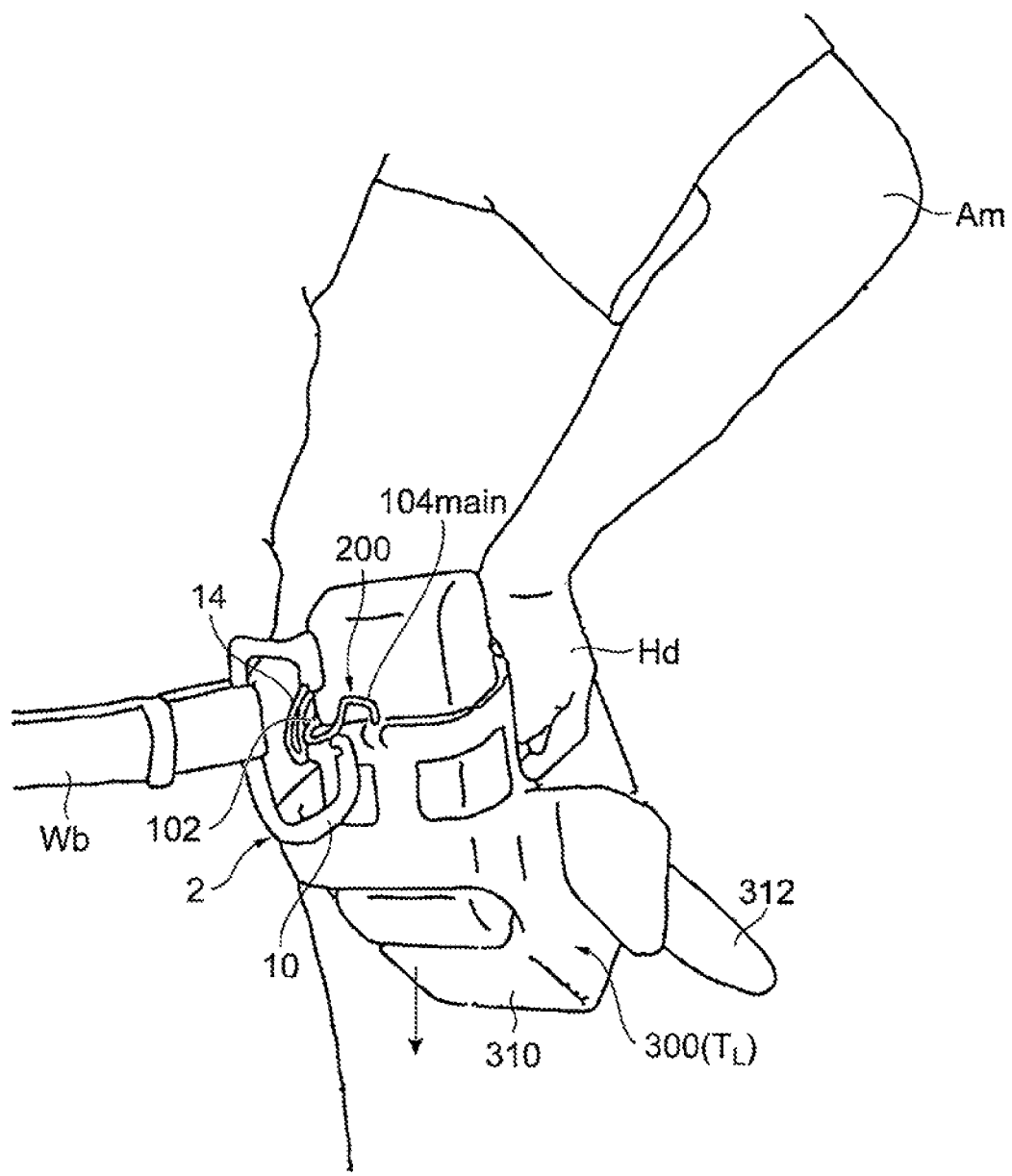
FIG. 16 shows a view for explaining a step of inserting an inner leg of the lifting hook of the example into a short-nose carabiner.

Attachment of Lifting Hook 200 to Short-Nose Carabiner 2 (FIGS. 15 to 17)

FIG. 15 shows a preparation step for attaching the lifting hook 200 to the short-nose carabiner 2. The worker Wk lifts the chainsaw 300 and laterally moves the chainsaw 300 to bring the chainsaw 300 closer to the body, so that the inner leg 102 is brought into contact with the gate lever 14. FIG. 16 shows a step of inserting the inner leg 102 into the carabiner 2, or specifically, the carabiner body 10. This insertion step is performed by moving the chainsaw 300 downward. This causes the inner leg 102 to open the gate lever 14 against the spring force, and the inner leg 102 enters the inside of the carabiner body 10. When this is finished, the gate lever 14 is automatically closed by the spring force.

As described with reference to FIGS. 15 and 16, the worker Wk moves the chainsaw 300 laterally inward and then lowers the chainsaw 300 to engage the hook 200 with the short-nose carabiner 2. FIG. 17 shows a state of the chainsaw 300 suspended from the waist belt Wb.

Figure 18:
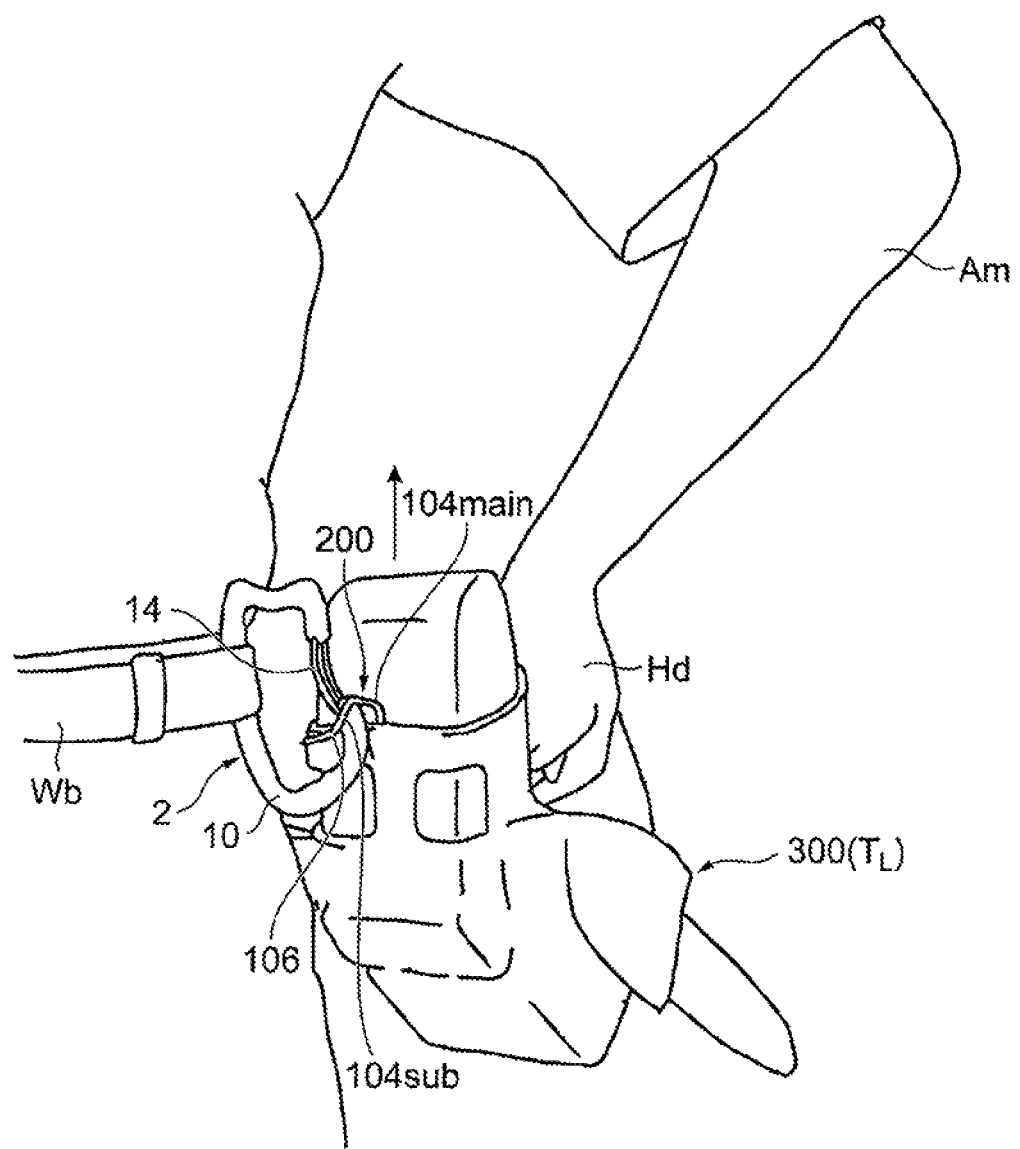
FIG. 18 shows a view for explaining a first preparation step of detaching the lifting hook of the example from the short-nose carabiner.
Figure 19:
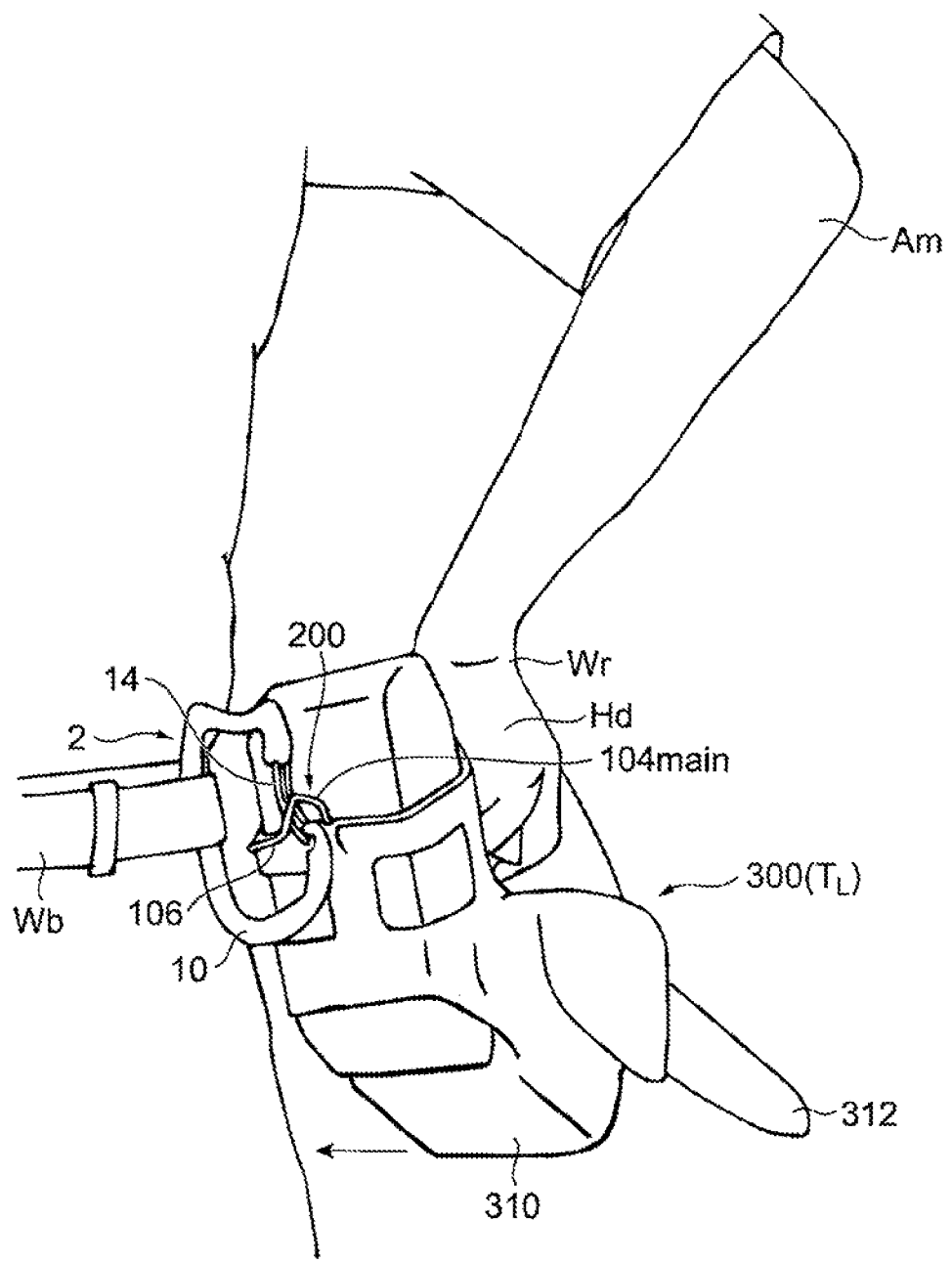
FIG. 19 shows a view for explaining a second preparation step of detaching the lifting hook of the example from the short-nose carabiner.

Detachment of Lifting Hook 200 from Short-Nose Carabiner 2 (FIGS. 18 to 20)

FIG. 18 shows a first preparation step for detaching the lifting hook 200 from the short-nose carabiner 2. The worker Wk lifts the chainsaw 300 to position the functional main portion 104main of the outer leg 104 to the level of height of the gate lever 14. FIG. 19 shows a second preparation step. The worker Wk laterally moves the chainsaw 300 toward the body side to bring the functional main portion 104main of the outer leg 104 into contact with the gate lever 14.

Subsequently, the worker Wk lowers the chainsaw 300. As a result, the gate lever 14 is opened by the outer leg 104 moving downward, and the outer leg 104 enters the inside of the carabiner body 10 (FIG. 20). As a result, the hook 200 can be located inside the carabiner body 10. Subsequently, the worker Wk can move the chainsaw 300 forward to pull out the hook 200 from the carabiner body 10.

As described above, the worker Wk can move the chainsaw 300 laterally inward, then lower the chainsaw 300, and move the chainsaw 300 forward to release the chainsaw 300 from the short-nose carabiner 2. This series of operations may be performed while the worker is visually observing the operations or may be performed in a groping manner.

Figure 21:
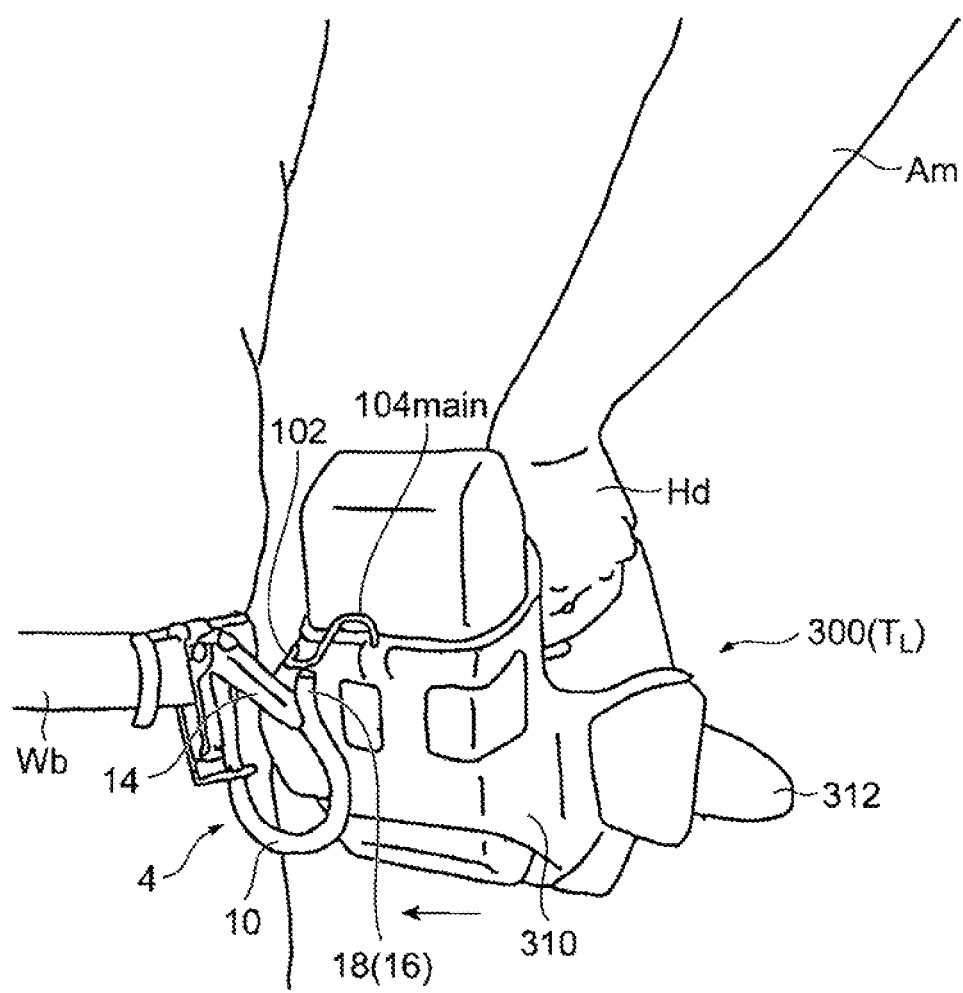
FIG. 21 shows a view for explaining a first preparation step for attaching the lifting hook of the example to a long-nose carabiner.
Figure 22:
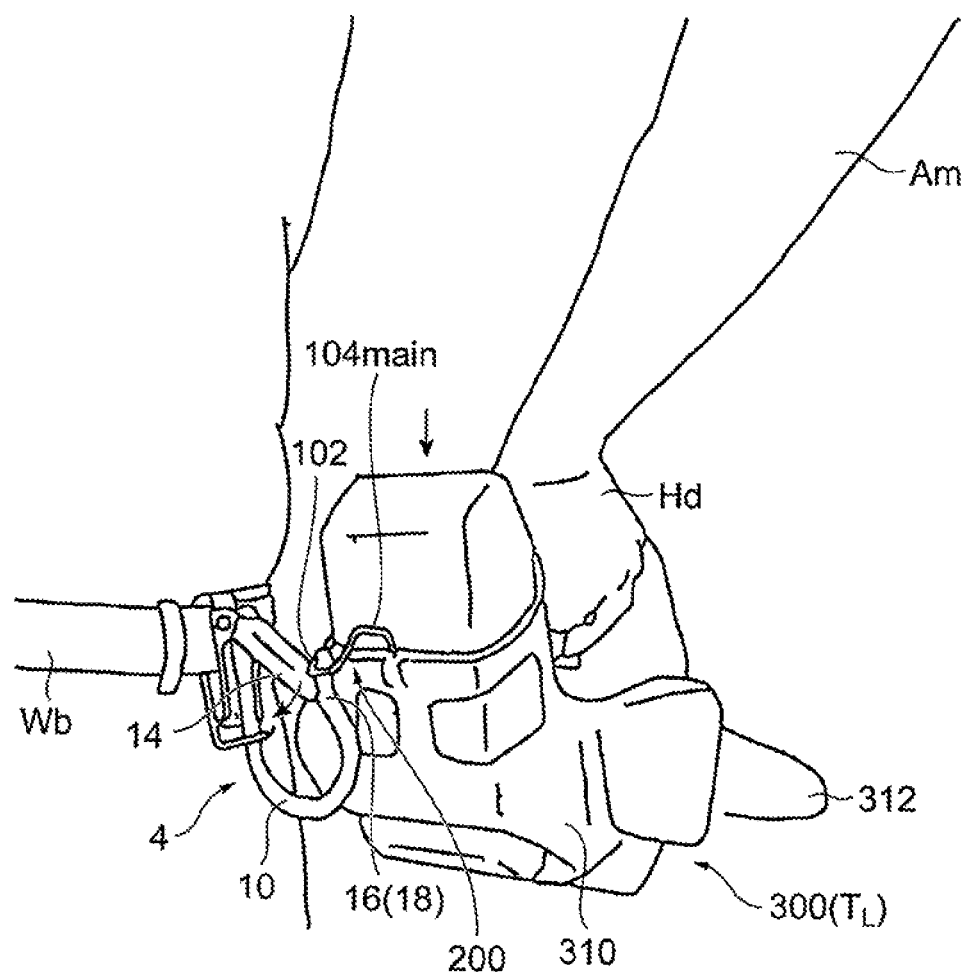
FIG. 22 shows a view for explaining a second preparation step for attaching the lifting hook of the example to the long-nose carabiner.
Figure 23:
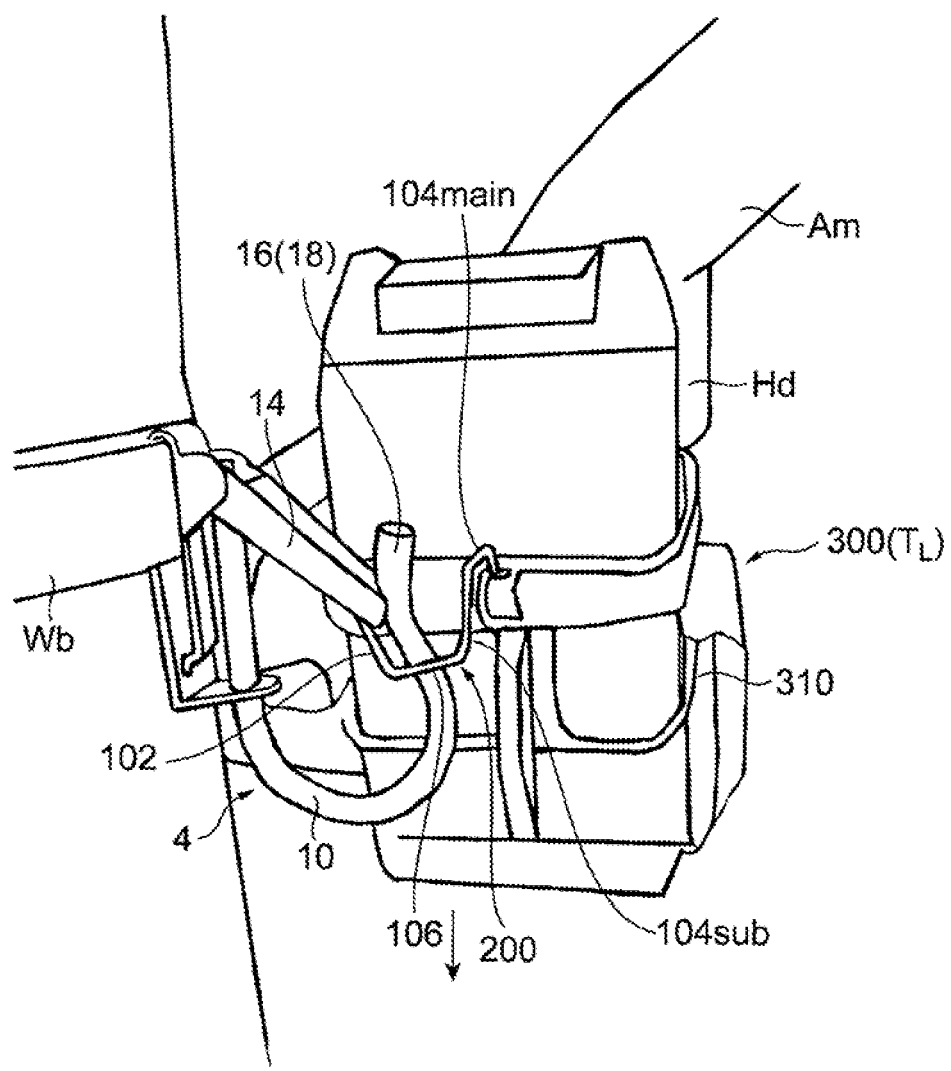
FIG. 23 shows a view for explaining a state of the lifting hook of the example attached to the long-nose carabiner.

Attachment of Lifting Hook 200 to Long-Nose Carabiner 4 (FIGS. 21 to 23)

FIG. 21 shows a preparation step for attaching the lifting hook 200 to the long-nose carabiner 4. The worker Wk lifts the chainsaw 300 and laterally moves the chainsaw 300 toward the body side to move the inner leg 102 to the inner side relative to the nose extension part 18. Subsequently, the chainsaw 300 is lowered to bring the inner leg 102 into contact with the gate lever 14 (FIG. 22). This completes the preparation for attachment. When the worker Wk then lowers the chainsaw 300 further downward, the gate lever 14 is opened by the inner leg 102, and the inner leg 102 enters the inside of the carabiner body 10 (FIG. 23).

As described with reference to FIGS. 21 to 23, the worker Wk lifts the chainsaw 300, moves the chainsaw 300 laterally inward, and then moves the chainsaw 300 downward to engage the lifting hook 200 with the long-nose carabiner 4.

This series of operations may be performed while the worker is visually observing the operations or may be performed in a groping manner.

Figure 24:
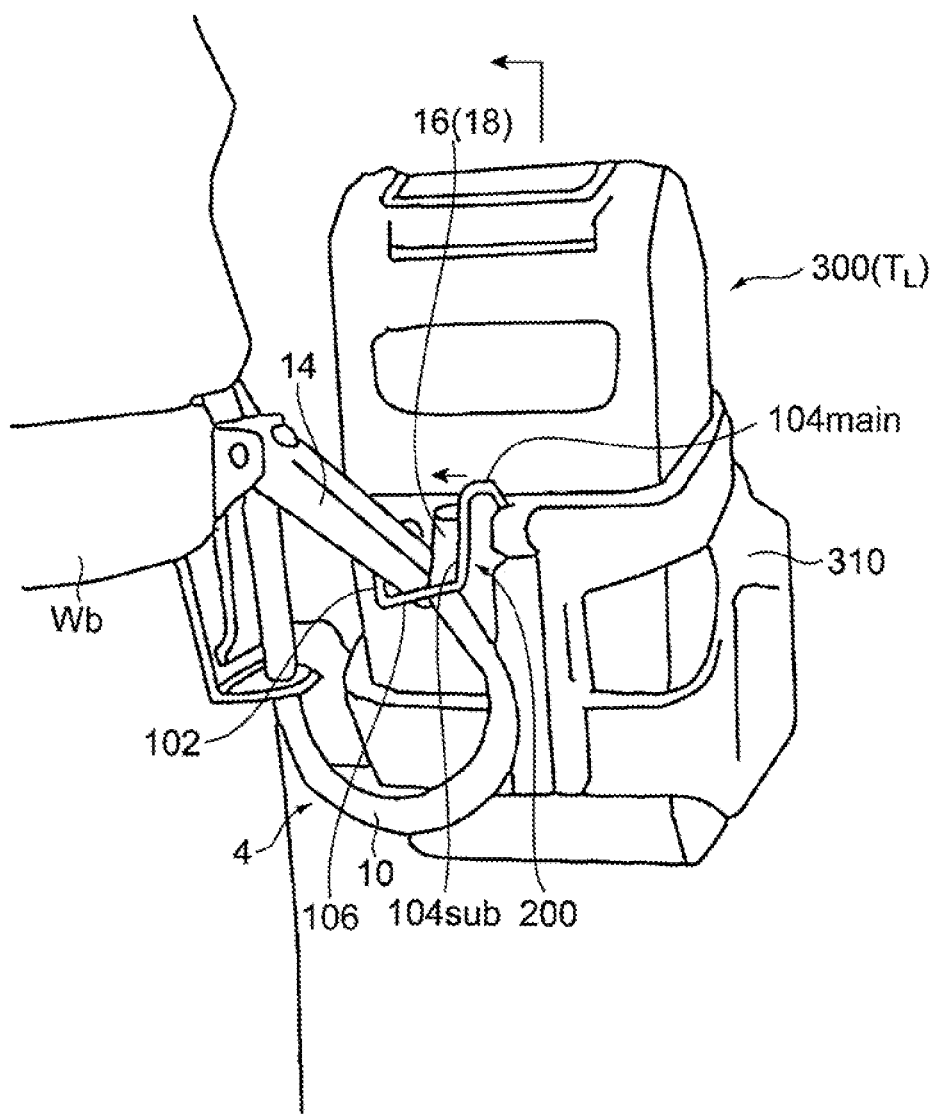
FIG. 24 shows a view for explaining a preparation step of detaching the lifting hook of the example from the long-nose carabiner.

Detachment of Lifting Hook 200 from Long-Nose Carabiner 4 (FIGS. 24 and 25)

The worker Wk lifts the chainsaw 300 (FIG. 24) and laterally moves the chainsaw 300 toward the body side to move the outer leg 104 to the inner side relative to the nose extension part 18 (FIG. 25). Subsequently, the chainsaw 300 is lowered to open the gate lever 14 with the functional main portion 104main of the outer leg 104, and the outer leg 104 is put into the carabiner body 10. As a result, both the inner and outer legs 102, 104 are located inside the carabiner body 10.

Subsequently, the worker Wk can pull out the hook 200 from the carabiner body 10 by moving the chainsaw 300 forward.

As described above, the worker Wk can lift the chainsaw 300, then move the chainsaw 300 laterally inward, then lower the chainsaw 300, and move the chainsaw 300 forward to release the chainsaw 300 from the long-nose carabiner 4. This series of operations may be performed while the worker is visually observing the operations or may be performed in a groping manner.

Referring to FIG. 13, when the lifting hook 200 is disposed on the chainsaw 300, the hook 200 is preferably offset closer to the worker as compared to the center grip 318. As a result, when the hook 200 is locked to and detached from the carabiner 2, 4, or particularly when the hook 200 is detached (when the worker brings the work tool TL close to the body and uses the outer leg 104 to open the gate 14 of the carabiner 2, 4), the worker's body is made farther from the work tool TL, so that the worker and the work tool TL are not too close to each other, and the worker's body and the work tool TL hardly come into contact each other, which improves workability.

Referring to FIG. 14, reference numeral "Axg" denotes a vertical axis of the chainsaw 300 when the worker grips the center grip 318 and lifts the chainsaw 300. "E" denotes a horizontal plane such as the ground. In the chainsaw 300, the pivot axis Axbase of the hook 200 is set to be located horizontally and made orthogonal to the vertical axis Axg of the chainsaw 300.

The hook 200 is disposed at the rear end in the longitudinal direction of the work tool TL and is located near the middle in the up-down direction. As a result, since the work tool TL is directed straight downward when suspended, the work tool TL is less likely to interfere with the worker. Additionally, when locking/detaching the hook to/from the carabiner, the worker lifts the work tool to about 90° for locking/detaching, resulting in favorable workability.

The included angle α between the first portion 104sub and the functional main portion 104main of the outer leg 104 gives a signal to the worker in a groping state. By setting the included angle α larger than 90°, the inner leg 102 of the carabiner 2, 4 can smoothly be moved in the carabiner body 10, and the operation can smoothly be performed at the time of locking/detaching of the lifting hook 200.

The lifting hook of the embodiment according to the present invention is preferably applicable to any hand-held work tool including a drive source. The drive source may be an internal combustion engine or an electric motor. Specific examples include a top handle type chainsaw and a chainsaw operated with both hands. Other major application examples are as follows:

(1) electric or engine-driven trimmer;
(2) electric or engine-driven brush cutter;
(3) electric impact drill;
(4) electric ratchet;
(5) electric wrench;
(6) electric scissors;
(7) electric or engine-driven axial or centrifugal blower;
(8) engine-driven vacuum; and
(9) bush cutter.

The brush cutter is generally operated with a main body held by both hands. When the lifting hook 100, 200 is locked to and detached from the carabiner 2, 4 while the brush cutter is held by both hands, the lifting hook 100, 200 is preferably disposed on the brush cutter so that the height difference H is formed between the inner leg 102 and the outer leg 104 while the worker is in the most natural posture and wrist state.

Modifications

Figure 26:
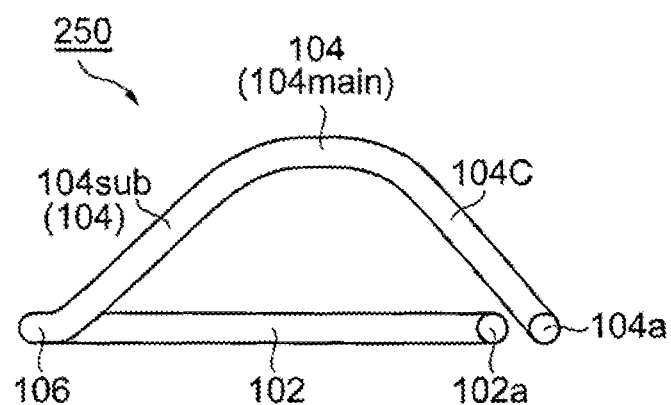
FIG. 26 shows a side view corresponding to FIG. 11, relating to a lifting hook of a first modification.
Figure 27:
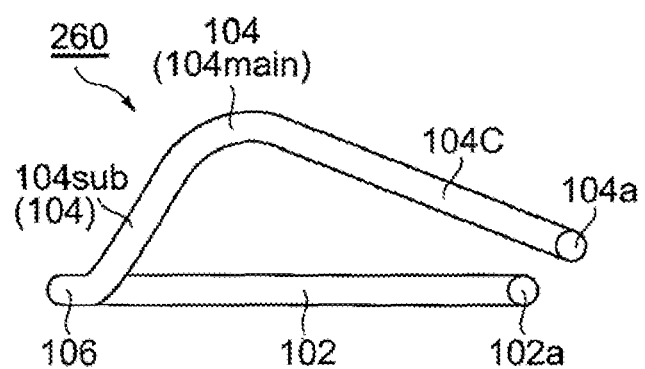
FIG. 27 shows a side view corresponding to FIG. 11, relating to a lifting hook of a second modification.
Figure 28:
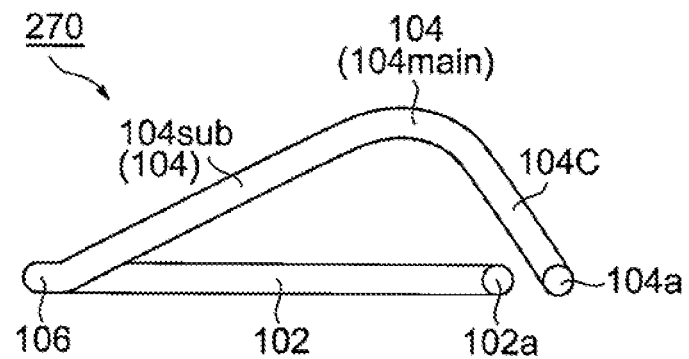
FIG. 28 shows a side view corresponding to FIG. 11, relating to a lifting hook of a third modification.
Figure 29:
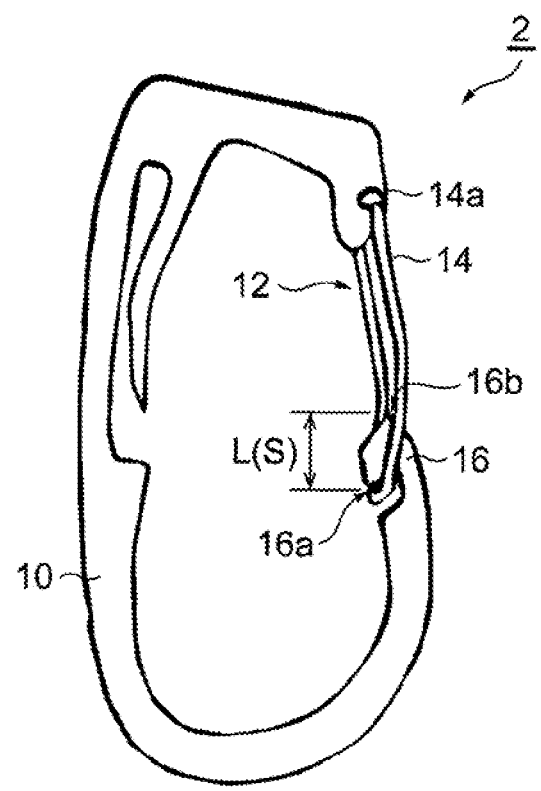
FIG. 29 shows a side view of a short-nose carabiner used for suspending a hand-held work tool.
Figure 30:
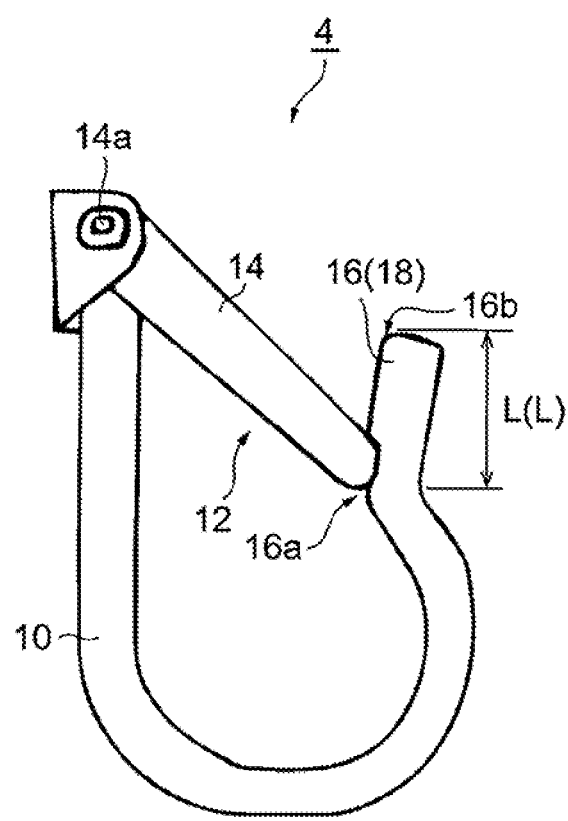
FIG. 30 shows a side view of a long-nose carabiner used for suspending a hand-held work tool.
Figure 31:
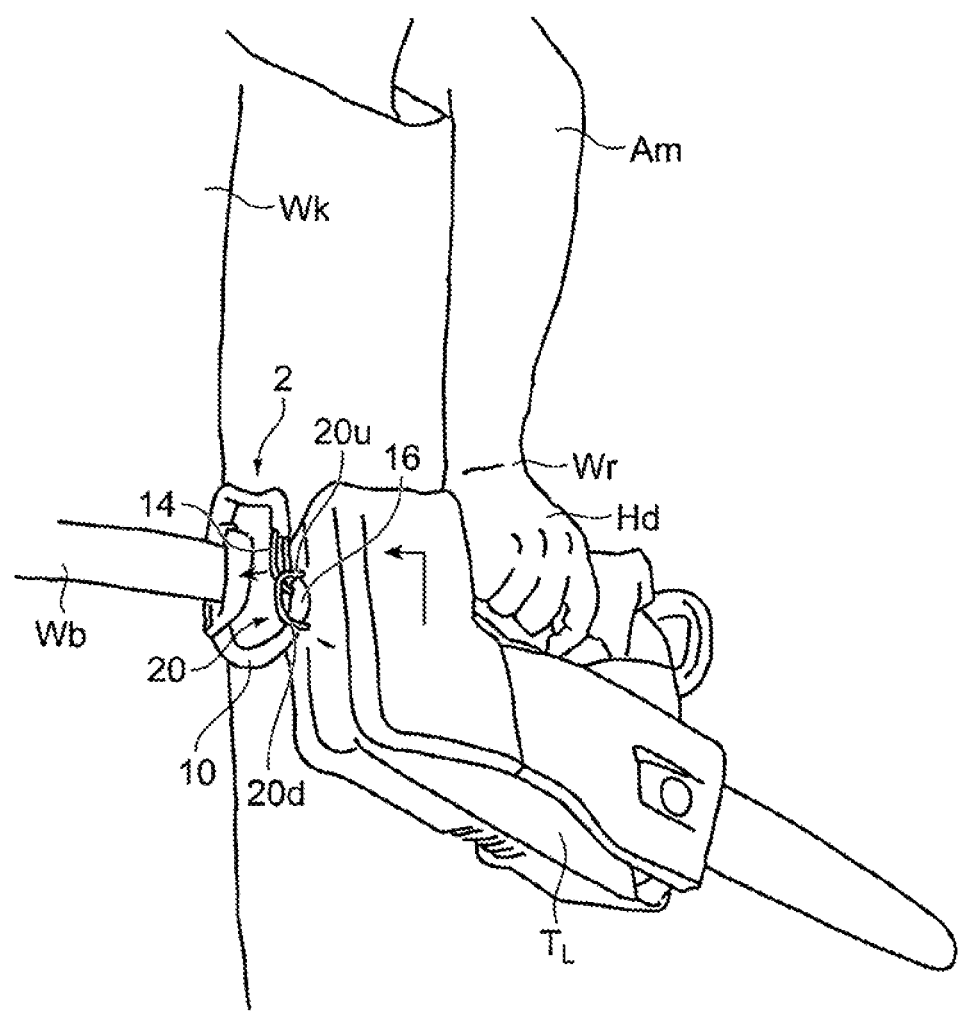
FIG. 31 shows a view for explaining a preparation step for attaching a conventional vertical hook to a short-nose carabiner.
Figure 32:
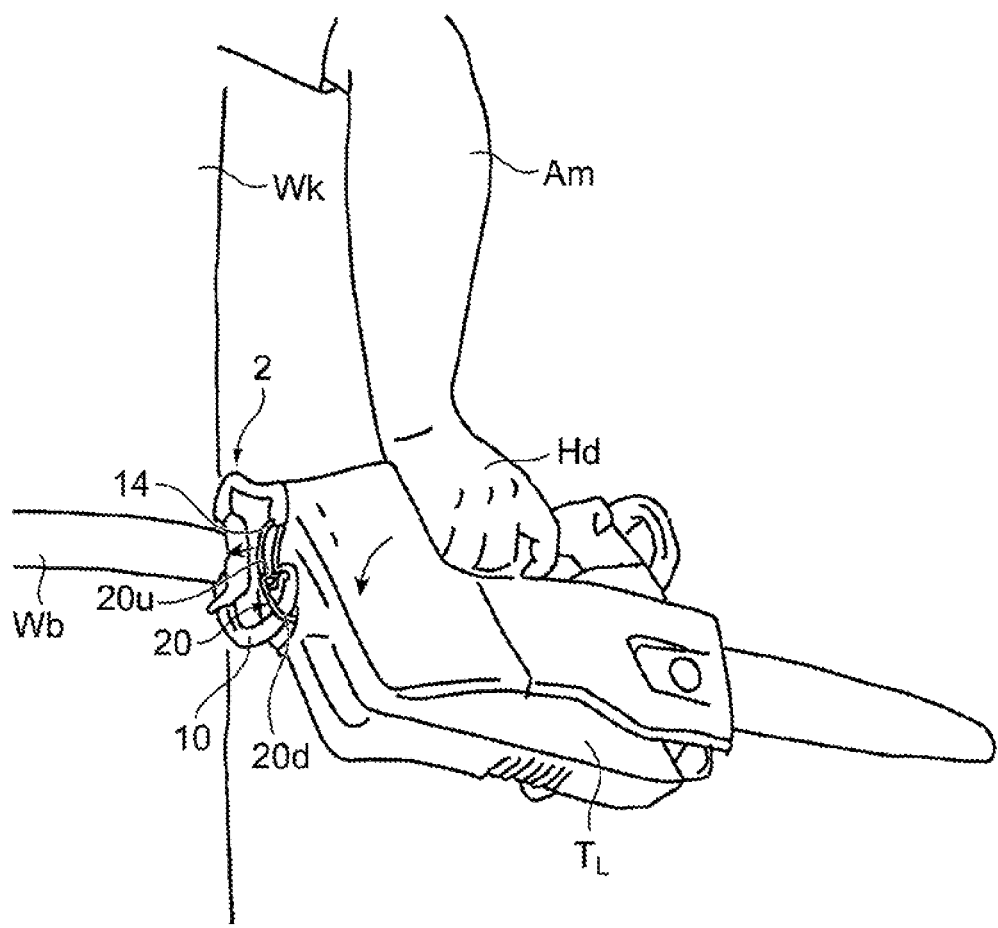
FIG. 32 shows a view for explaining a step of attaching the conventional vertical hook to the short-nose carabiner.
Figure 33:
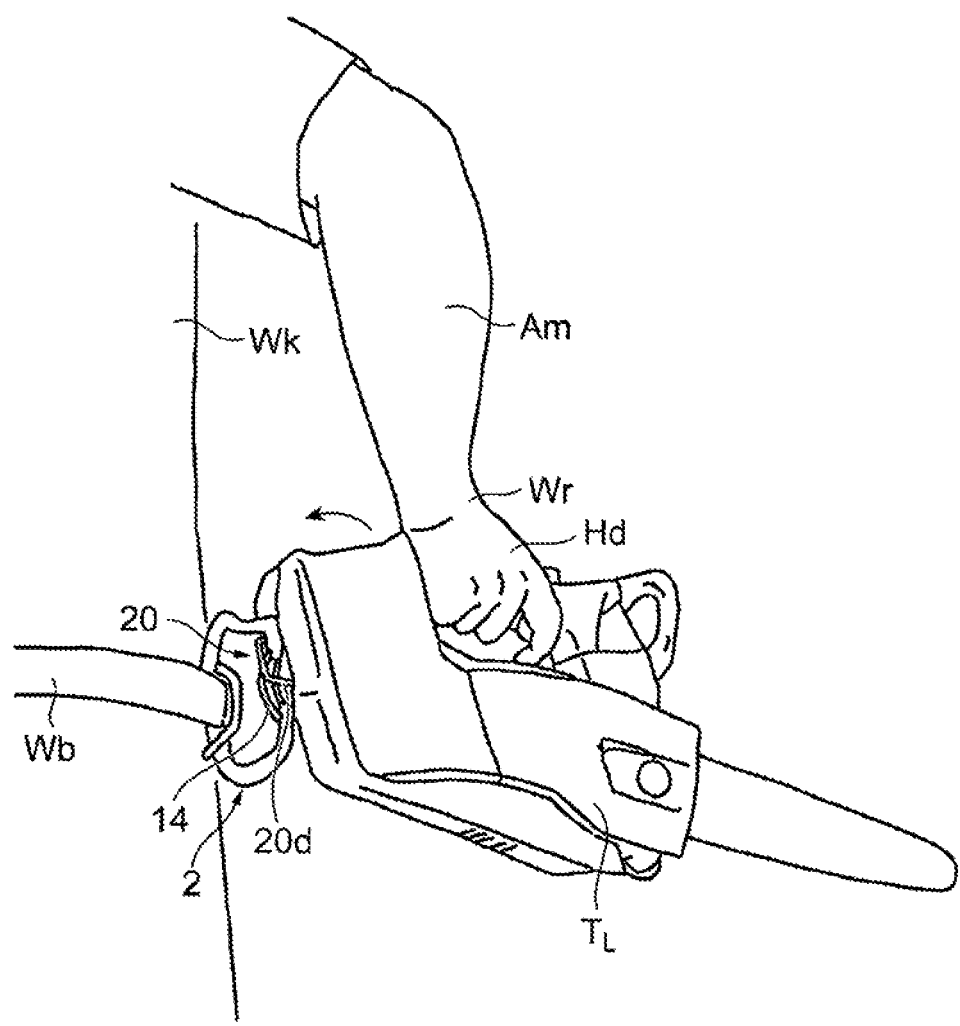
FIG. 33 shows a view for explaining a detachment preparation step of the conventional vertical hook from the short-nose carabiner.
Figure 34:
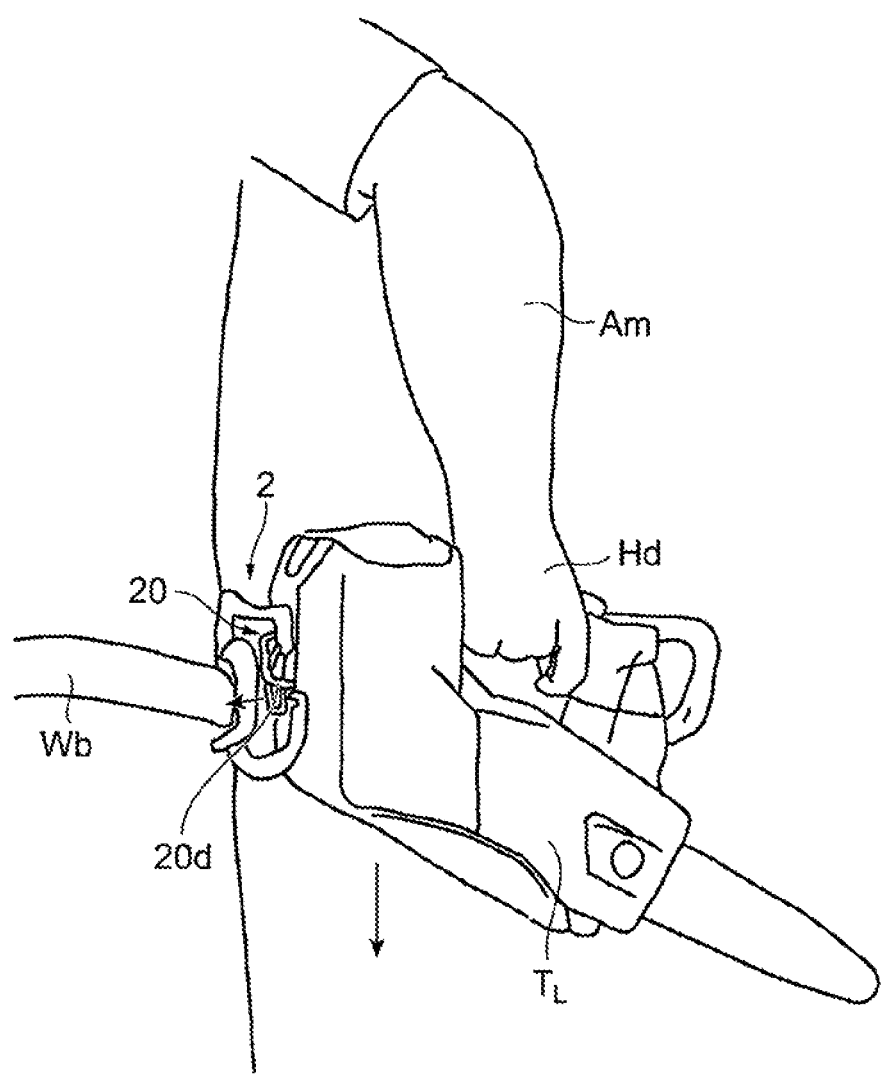
FIG. 34 shows a view for explaining a step of detaching the conventional vertical hook from the short-nose carabiner.
Figure 35:
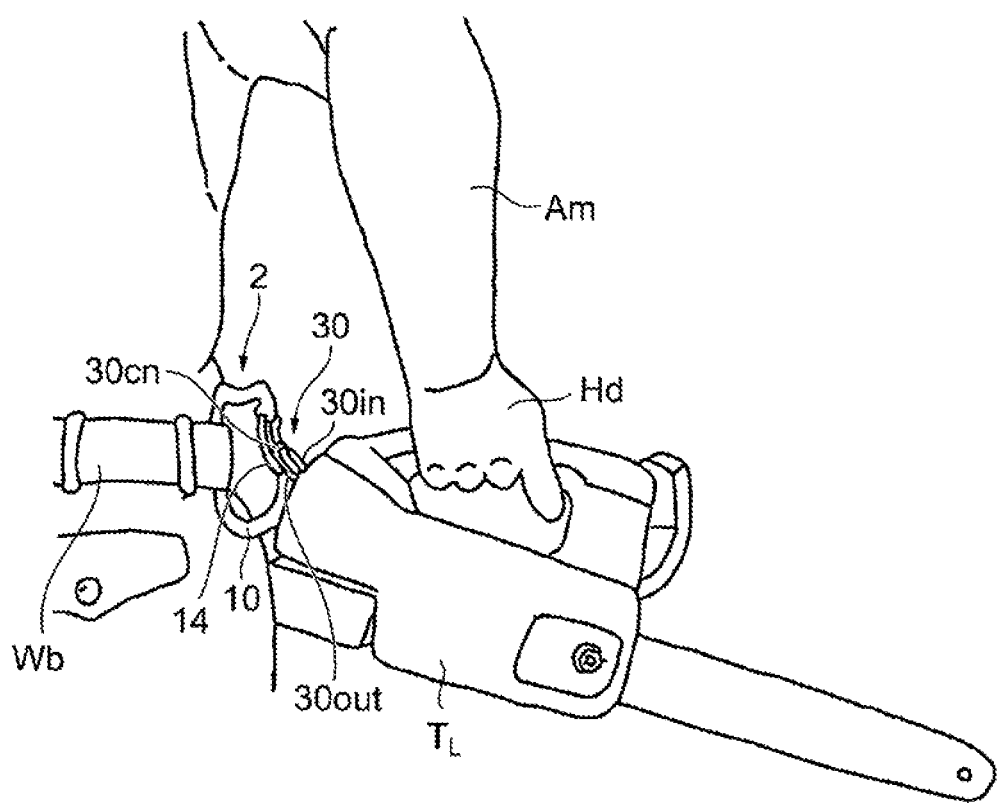
FIG. 35 shows a view for explaining a preparation step for attaching a conventional horizontal hook on the short-nose carabiner.
Figure 36:
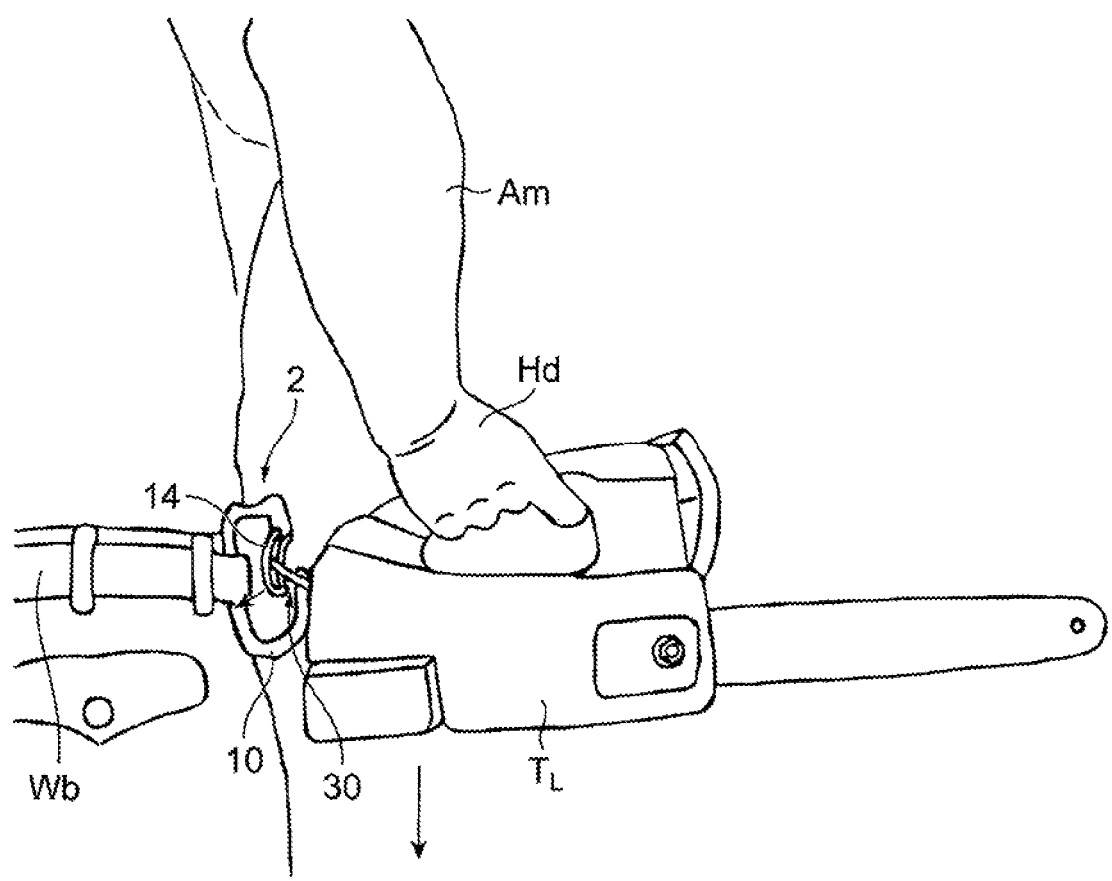
FIG. 36 shows a view for explaining a step of attaching the conventional horizontal hook to the short-nose carabiner.
Figure 37:
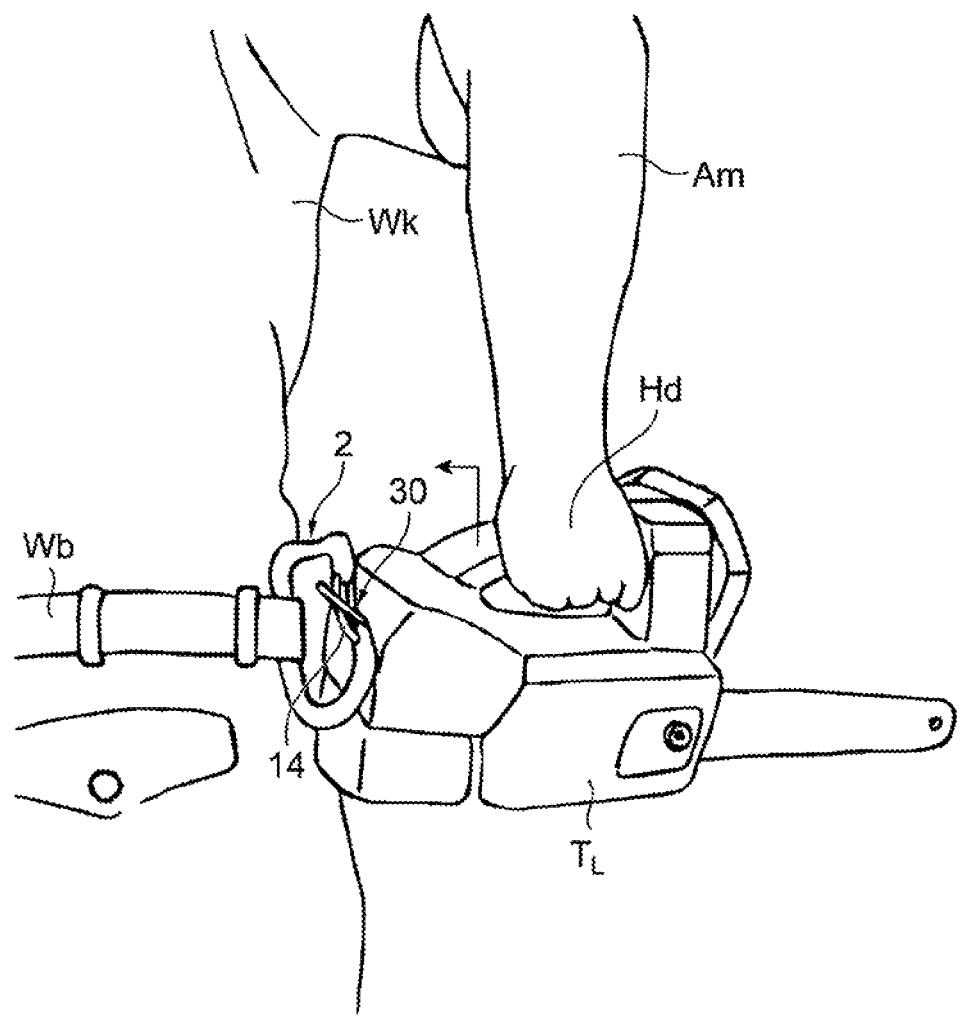
FIG. 37 shows a view for explaining a preparation step for detaching the conventional horizontal hook from the short-nose carabiner.
Figure 38:
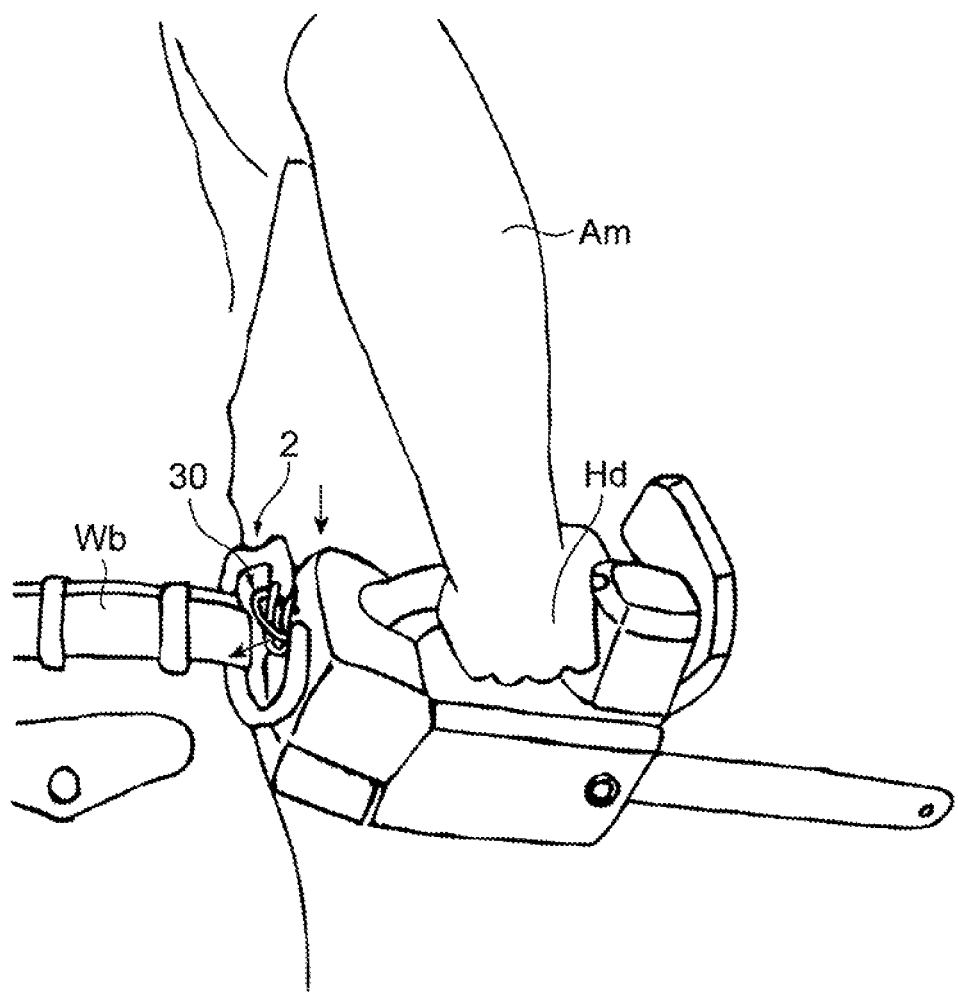
FIG. 38 shows a view for explaining a step of detaching the conventional horizontal hook from the short-nose carabiner.
Figure 39:
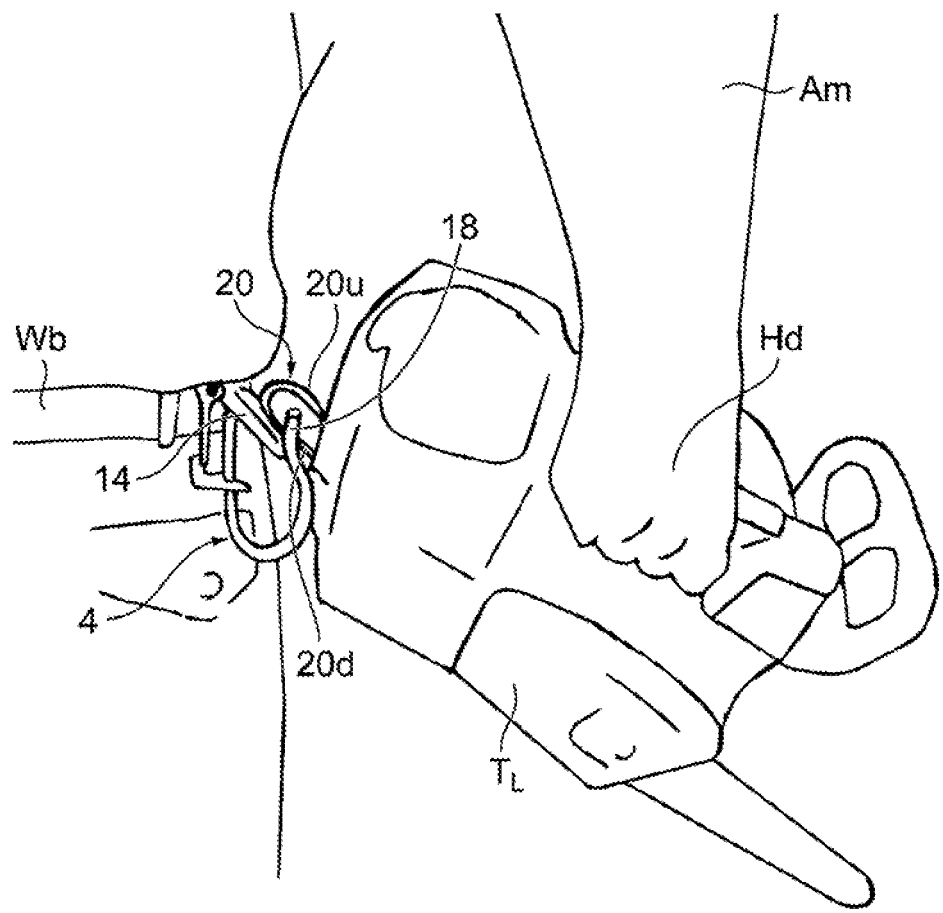
FIG. 39 shows a view for explaining a preparation step for attaching the conventional vertical hook to a long-nose carabiner.
Figure 40:
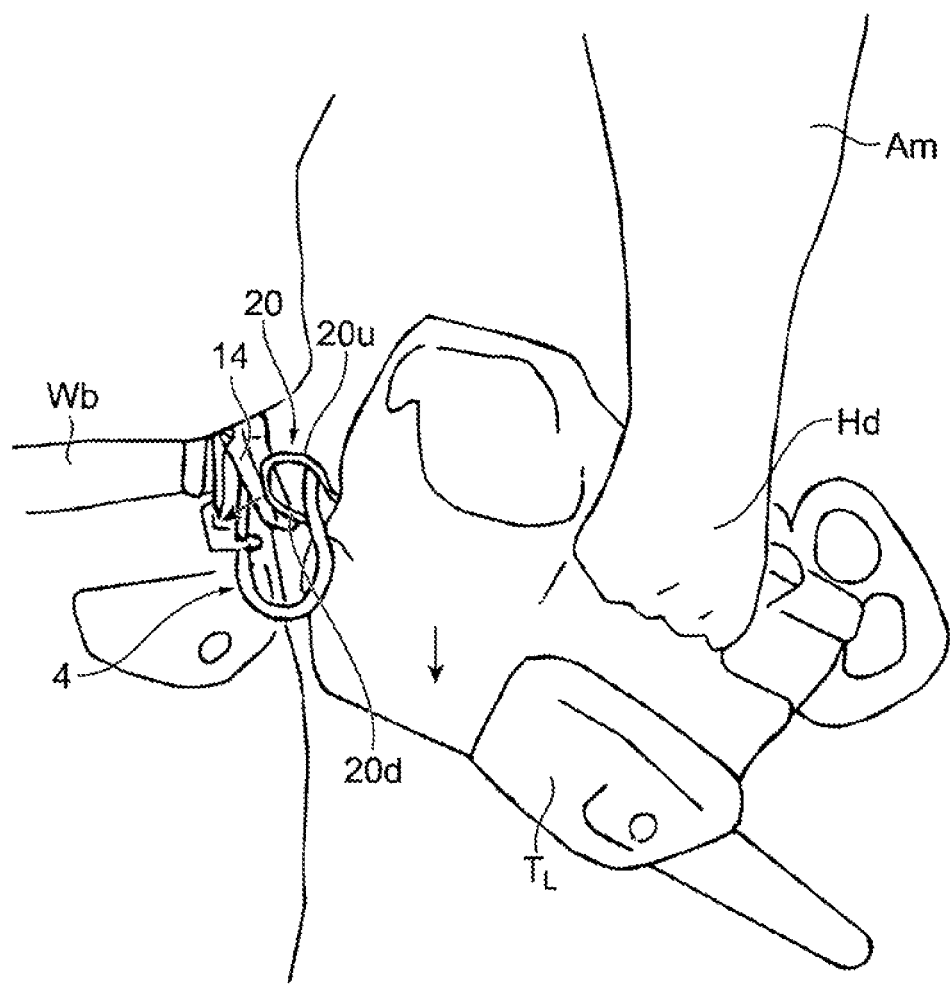
FIG. 40 shows a view for explaining a step of attaching the conventional vertical hook to the long-nose carabiner.
Figure 41:
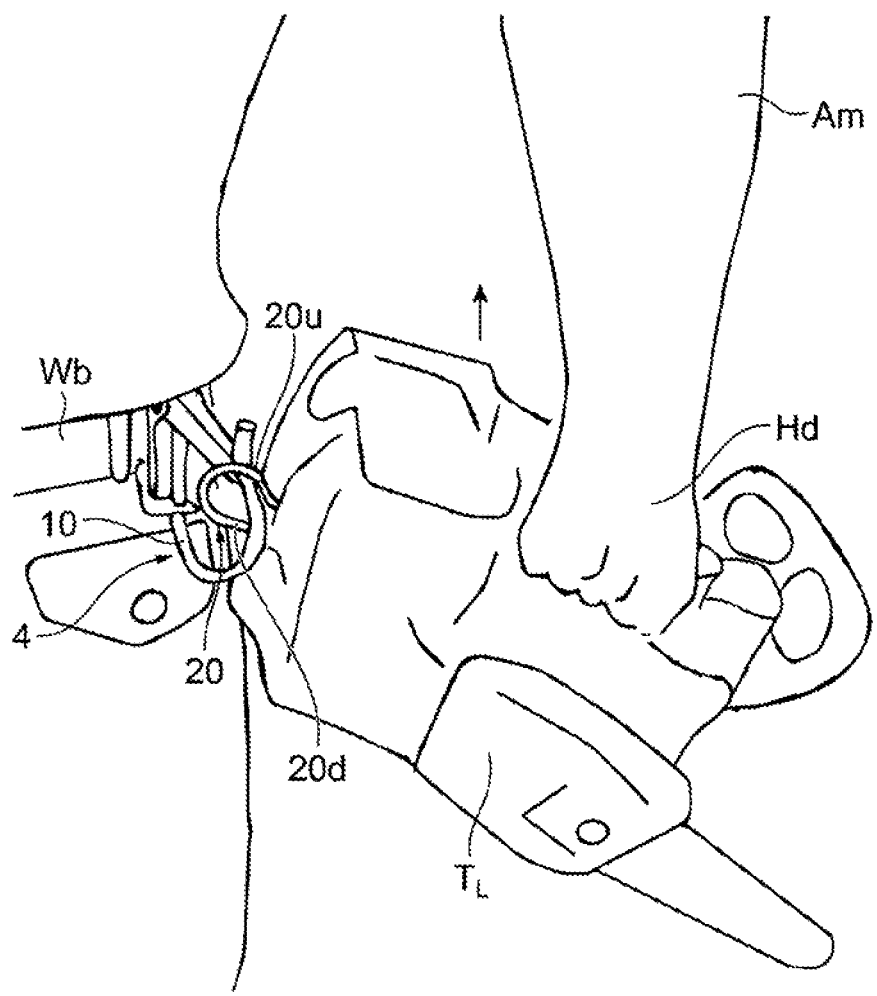
FIG. 41 shows a view for explaining a preparation step for detaching the conventional vertical hook from the long-nose carabiner.
Figure 42:
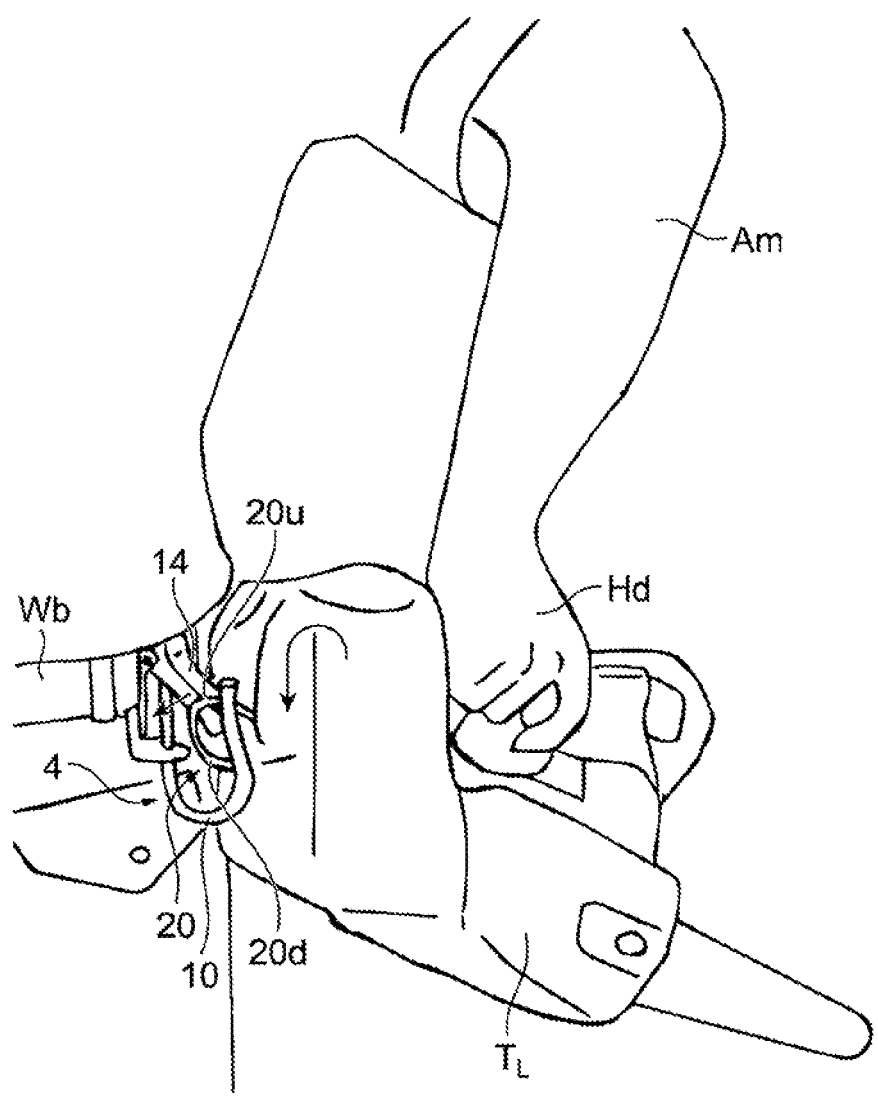
FIG. 42 shows a view for explaining a first step of detaching the conventional vertical hook from the long-nose carabiner.
Figure 43:
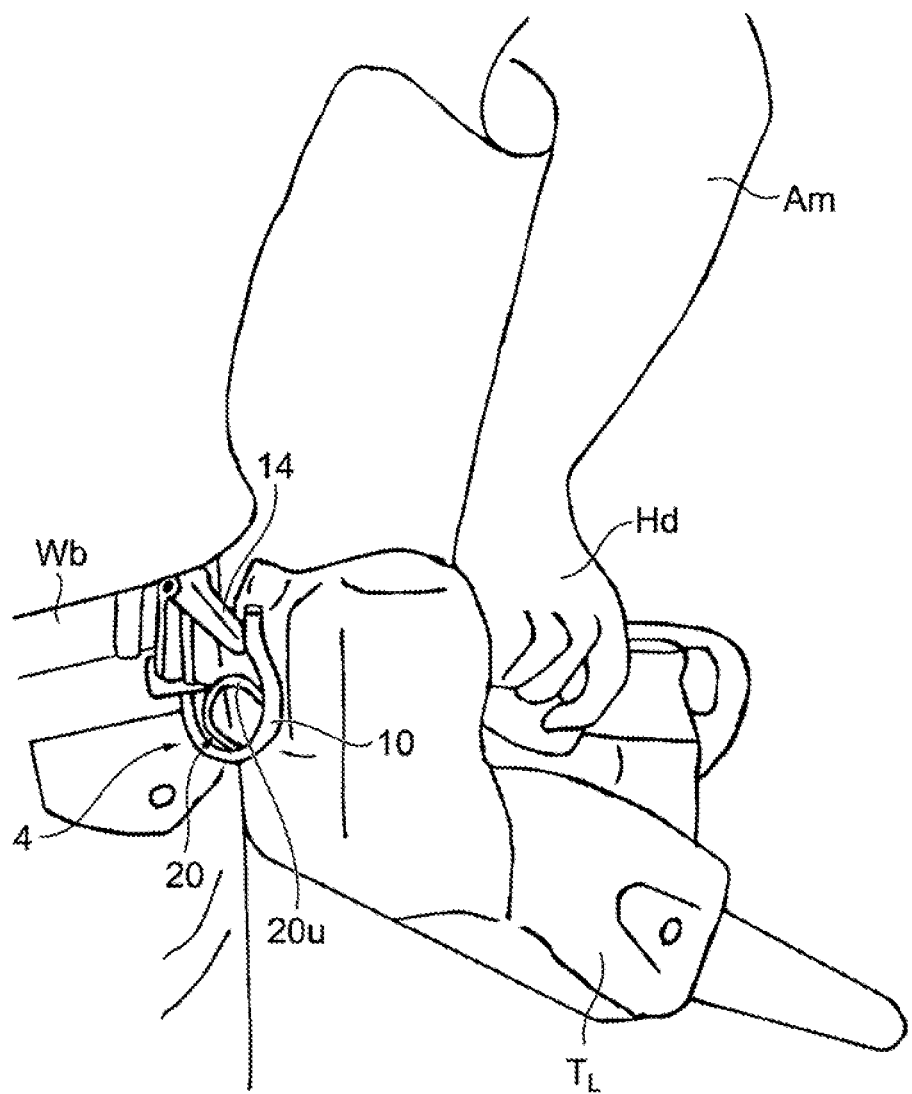
FIG. 43 shows a view for explaining a second step of detaching the conventional vertical hook from the long-nose carabiner.
Figure 44:
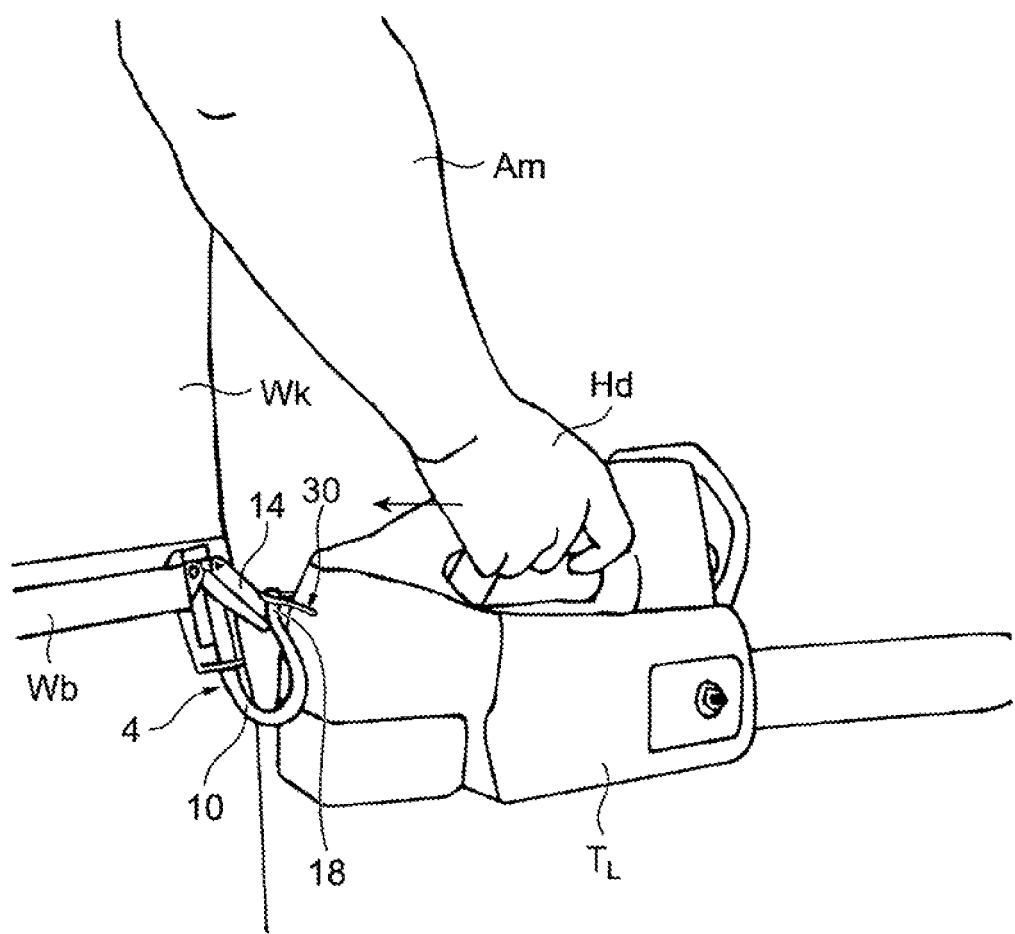
FIG. 44 shows a view for explaining a preparation step for attaching the conventional horizontal hook to the long-nose carabiner.
Figure 45:
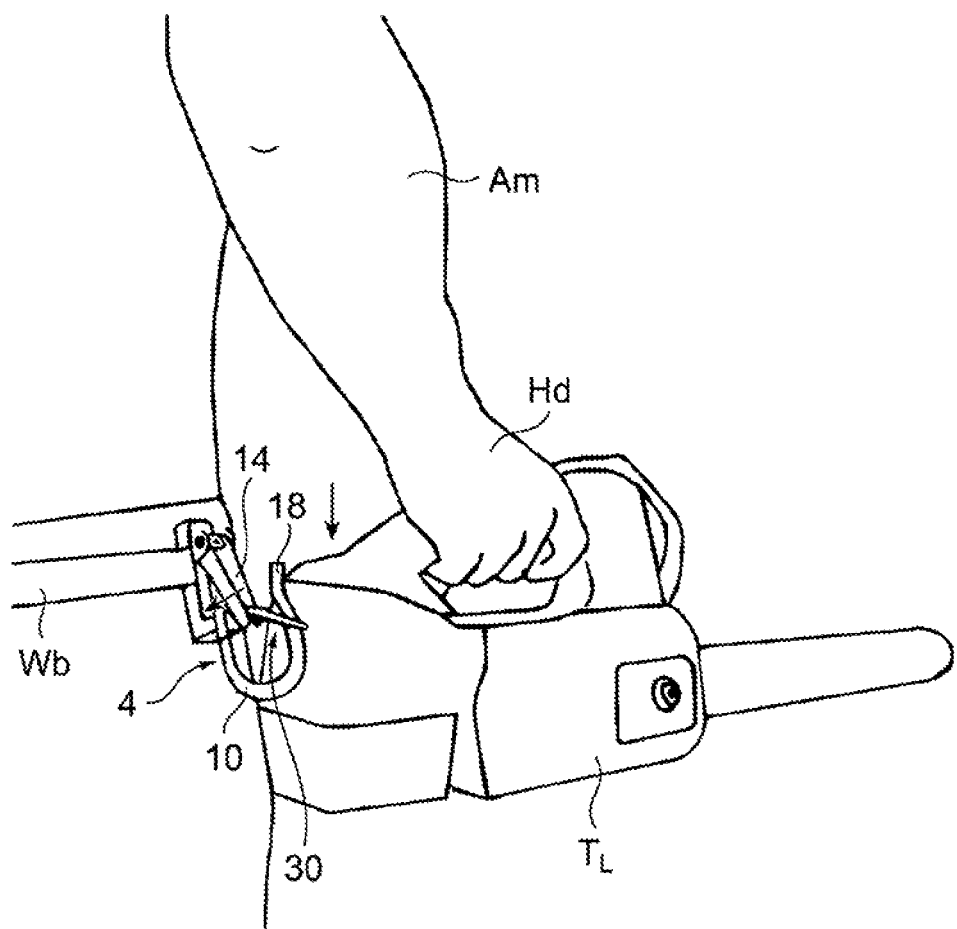
FIG. 45 shows a view for explaining a step of attaching the conventional horizontal hook to the long-nose carabiner.
Figure 46:
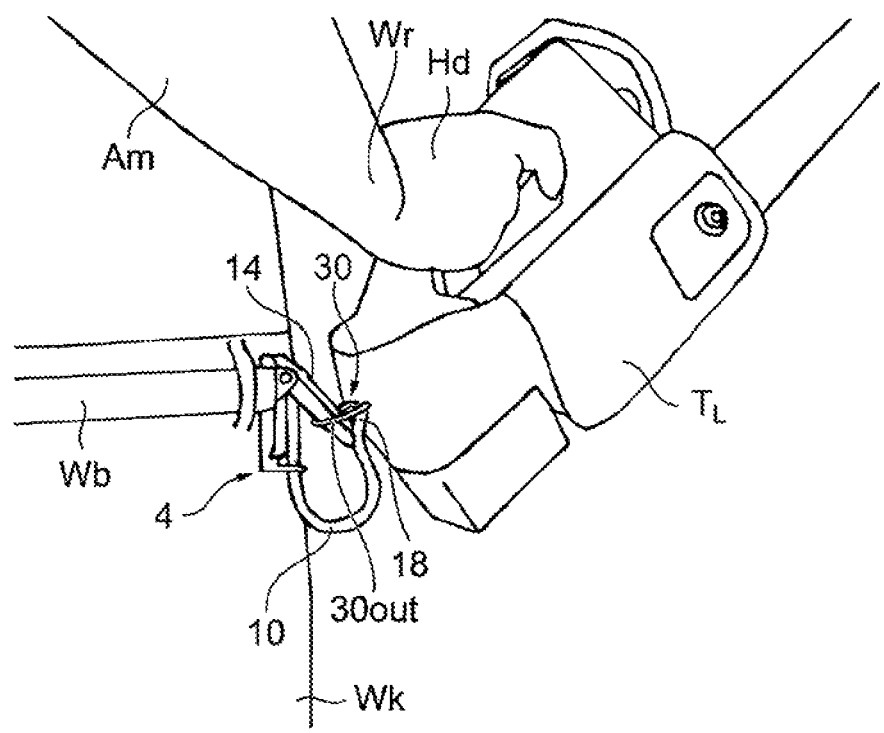
FIG. 46 shows a view for explaining a step for detaching the conventional horizontal hook from the long-nose carabiner.

FIGS. 26 to 28 are views for explaining multiple modifications. FIG. 26 is a side view corresponding to FIG. 11 related to the lifting hook 200 and shows a lifting hook 250 of a first modification. In this lifting hook 250, the outer leg 104 includes the inclined first portion 104sub as in the hook 200 of FIGS. 9 to 11; however, the functional main portion 104main having a length is relatively short, and an inclined third portion 104C is included between the functional main portion 104main and the bent end 104a. The third portion 104C is inclined downward and leads to the bent end 104a.

FIG. 27 shows a lifting hook 260 of a second modification. In the lifting hook 260, the functional main portion 104main having a length has a rounded shape when viewed from the side, and the functional main portion 104main smoothly continues to the third portion 104C. The round-shaped functional main portion 104main is disposed relatively close to the connecting part 106. The included angle α between the first portion 104sub and the functional main portion 104main is preferably greater than 90°.

FIG. 28 shows a lifting hook 270 of a third modification. This lifting hook 270 has the round-shaped functional main portion 104main as in the second modification (FIG. 27); however, the second modification is different in that the functional main portion 104main is disposed relatively close to the bent end 104a (FIG. 27). In this third modification, the included angle α between the first portion 104sub and the functional main portion 104main is preferably greater than 90°.

In the case of the top handle type chainsaw, a worker holding the work tool with one hand has a natural posture due to the center of gravity of the work tool; however, the natural posture is not limited to the example described above and may be, for example, a posture described in an instruction manual for locking to/detaching from the carabiner, or a posture in which the worker can easily perform the locking/detaching operations. For example, in the case of the chainsaw mainly illustrated in the example, the upper side (vertical plane) of the work tool is held at the time of locking to/detaching from the carabiner for performing the locking/detaching operations; however, holding the side portion (horizontal plane) of the work tool may be more preferable for the locking/detaching operations in some cases. Although the top handle type chainsaw described in the example has the lifting hook located on the rear side, the lifting hook may be located on the side portion of the chainsaw. Even in this case, the burden on the worker is reduced as long as a height difference exists between the inner leg and the outer leg.

2 short-nose carabiner
4 long-nose carabiner
10 carabiner body
12 gate portion
147 gate lever
100 lifting hook
102 inner leg of lifting hook
102a bent end of inner leg
104 outer leg of lifting hook
104a bent end of outer leg
104sub first portion of outer leg (portion functionally constituting a portion of a connecting part)
104main second portion of outer leg (functional main portion of outer leg)
106 connecting part of lifting hook
200 lifting hook of example
300 (TL) chainsaw (work tool)

What is claimed is:

1. A lifting hook comprising:
    an inner leg and an outer leg, each of the inner leg and outer leg fixed to a rear end surface of a work tool with a power source, and each of the inner leg and the outer leg having a respective length that projects in a rearward direction away from the work tool; and
    a connecting part having a length, the connecting part connecting free ends of the inner and outer legs to each other, wherein
    when a worker equipped with a lever-type carabiner holds the work tool, the inner leg of the lifting hook is located on an inner side close to the carabiner while the outer leg is located on an outer side far from the carabiner,
    the length of the inner leg is disposed along a first plane, and at least a portion of the length of the outer leg is disposed along a second plane that is elevated above the first plane relative to a horizontal axis of the rear end surface of the work tool so that the portion of the length of the outer leg is located higher than the inner leg, and
    at least one of the respective lengths of the inner leg, the connecting part, and the outer leg is disposed along a plane that is at an angle relative to the horizontal axis of the rear end surface of the work tool.

2. The lifting hook according to claim 1, wherein the worker is not twisting the wrist when the worker holds the work tool.

3. The lifting hook according to claim 1, wherein the outer leg includes a first portion adjacent to the connecting part and a main functional part, and wherein the main functional part is located higher than the inner leg.

4. The lifting hook according to claim 3, wherein the angle is an included angle (α) between the first portion and the main functional part, and the included angle (α) is greater than 90° and equal to or less than 170°.

5. The lifting hook according to claim 1, wherein the lifting hook has a tapered shape.

6. The lifting hook according to claim 5, wherein the lifting hook is designed such that when the carabiner holds the lifting hook and the worker holds the work tool, the inner leg is inclined in a direction away from the carabiner toward the connecting part in planar view.

7. The lifting hook according to claim 1, wherein the lifting hook is designed such that when the worker is in an act of locking the lifting hook to the carabiner, the worker twists the wrist to rotate the work tool by an angle of 35° or less and when the worker is in an act of detaching the lifting hook from the carabiner, the worker twists the wrist to rotate the work tool by an angle of 35° or less.

8. The lifting hook according to claim 2, wherein the lifting hook is designed such that when the worker is in an act of locking the lifting hook to the carabiner, the worker twists the wrist to rotate the work tool by an angle of 35° or less and when the worker is in an act of detaching the lifting hook from the carabiner, the worker twists the wrist to rotate the work tool by an angle of 35° or less.

9. The lifting hook according to claim 1, wherein the lifting hook is designed such that when the worker is in an act of locking the lifting hook to the carabiner, the worker twists the wrist to rotate the work tool by an angle of 25° or less and when the worker is in an act of detaching the lifting hook from the carabiner, the worker twists the wrist to rotate the work tool by an angle of 25° or less.

10. The lifting hook according to claim 2, wherein the lifting hook is designed such that when the worker is in an act of locking the lifting hook to the carabiner, the worker twists the wrist to rotate the work tool by an angle of 25° or less and when the worker is in an act of detaching the lifting hook from the carabiner, the worker twists the wrist to rotate the work tool by an angle of 25° or less.

11. The lifting hook according to claim 1, wherein the lifting hook is designed such that when the worker is in an act of locking the lifting hook to the carabiner, the worker twists the wrist to rotate the work tool by an angle of 10° or less and when the worker is in an act of detaching the lifting hook from the carabiner, the worker twists the wrist to rotate the work tool by an angle of 10° or less.

12. The lifting hook according to claim 2, wherein the lifting hook is designed such that when the worker is in an act of locking the lifting hook to the carabiner, the worker twists the wrist to rotate the work tool by an angle of 10° or less and when the worker is in an act of detaching the lifting hook from the carabiner, the worker twists the wrist to rotate the work tool by an angle of 10° or less.

13. The lifting hook according to claim 1, wherein the lifting hook is manufactured by bending one rod.

14. A lifting hook comprising:
    an inner leg and an outer leg, each of the inner leg and outer leg comprising a respective end fixed to a work tool with a power source, each of the inner leg and the outer leg having a respective length that projects in a direction away from the work tool, the work tool further comprising an inner side and an outer side, wherein the inner leg is disposed closer to the inner side and the outer leg is disposed closer to the outer side; and a connecting part having a length, the connecting part connecting free ends of the inner and outer legs to each other, the free ends being opposite the respective ends fixed to the work tool, wherein
    at least one of the respective lengths of the inner leg, the connecting part, and the outer leg is disposed along a plane that is at an angle relative to a horizontal axis of the work tool, and
    the length of the inner leg is disposed along a first plane, and at least a portion of the length of the outer leg is disposed along a second plane that is elevated above the first plane relative to the horizontal axis of the work tool so that the portion of the outer leg is located higher than the inner leg.

15. The lifting hook according to claim 14, wherein the outer leg includes a first portion adjacent to the connecting part and a main functional part, and wherein the main functional part is located higher than the inner leg.

16. The lifting hook according to claim 15, wherein an included angle ($\alpha$) between the first portion and the main functional part is greater than 90° and equal to or less than 170°.

17. The lifting hook according to claim 14, wherein the lifting hook has a tapered shape.

18. The lifting hook according to claim 14, wherein the lifting hook is designed such that when the lifting hook is locked to or detached from the carabiner, the worker twists the wrist to rotate the work tool by an angle of 35° or less.

19. The lifting hook according to claim 14, wherein the lifting hook is designed such that when the worker is in an act of locking the lifting hook to the carabiner, the worker twists the wrist to rotate the work tool by an angle of 25° or less and when the worker is in an act of detaching the lifting hook from the carabiner, the worker twists the wrist to rotate the work tool by an angle of 25° or less.

20. The lifting hook according to claim 14, wherein the lifting hook is designed such that when the worker is in an act of locking the lifting hook to the carabiner, the worker twists the wrist to rotate the work tool by an angle of 10° or less and when the worker is in an act of detaching the lifting hook from the carabiner, the worker twists the wrist to rotate the work tool by an angle of 10° or less.

21. A lifting hook comprising:
   an inner leg and an outer leg, each of the inner leg and outer leg comprising a respective end fixed to a rear end surface of a work tool with a power source, each of the inner leg and the outer leg having a respective length that projects in a rearward direction away from the work tool; and
   a connecting part having a length, the connecting part connecting a free end of the inner leg at a first angle, and the connecting part connecting a free end of the outer leg at a second angle, the free ends being opposite the respective ends fixed to the rear end surface of the work tool, wherein
   when a worker equipped with a lever-type carabiner holds the work tool, the inner leg of the lifting hook is located on an inner side close to the carabiner while the outer leg is located on an outer side far from the carabiner,
   the length of the inner leg is disposed along a first plane, and at least a portion of the length of the outer leg is disposed along a second plane that is elevated above the first plane relative to a horizontal axis of the rear end surface the work tool so that the portion of the length of the outer leg is located higher than the inner leg,
   the inner leg is configured to open a gate-lever of the carabiner in an act of a locking motion, and
   the outer leg is configured to open the gate-lever of the carabiner in an act of a detaching motion.

* * * * *